United States Patent
Christensen et al.

(10) Patent No.: US 10,144,284 B2
(45) Date of Patent: Dec. 4, 2018

(54) FOUR-WHEEL DRIVE VEHICLE CONTROL SYSTEM AND METHODS

(71) Applicant: WARN AUTOMOTIVE, LLC, Milwaukie, OR (US)

(72) Inventors: Kevin M. Christensen, Portland, OR (US); Oliver Blake Randall, Wilsonville, OR (US); Christopher James Boudreau, Portland, OR (US)

(73) Assignee: Warn Automotive, LLC, Milwaukie, OR (US)

( * ) Notice: Subject to any disclaimer, the term of this patent is extended or adjusted under 35 U.S.C. 154(b) by 119 days.

(21) Appl. No.: 15/419,611

(22) Filed: Jan. 30, 2017

(65) Prior Publication Data

US 2017/0225564 A1 Aug. 10, 2017

Related U.S. Application Data

(60) Provisional application No. 62/292,130, filed on Feb. 5, 2016.

(51) Int. Cl.
*B60K 23/08* (2006.01)

(52) U.S. Cl.
CPC .... *B60K 23/0808* (2013.01); *B60K 2023/085* (2013.01); *B60K 2023/0883* (2013.01); *B60Y 2300/18008* (2013.01)

(58) Field of Classification Search
None
See application file for complete search history.

(56) References Cited

U.S. PATENT DOCUMENTS

| 5,740,042 A * | 4/1998 | Fujioka ............... B60K 28/16 180/197 |
| 2001/0003109 A1 | 6/2001 | Tabata |
| 2012/0089310 A1 | 4/2012 | Sakagami et al. |
| 2014/0144259 A1* | 5/2014 | Downs ............... B60K 23/08 74/55 |
| 2014/0297145 A1 | 10/2014 | Nihanda et al. |
| 2015/0006011 A1 | 1/2015 | Gibson et al. |

FOREIGN PATENT DOCUMENTS

WO 2012138953 A2 10/2012

OTHER PUBLICATIONS

ISA Korean Intellectual Property Office, International Search Report and Written Opinion Issued in Application No. PCT/US2017/015635, dated Apr. 25, 2017, WIPO, 7 pages.

* cited by examiner

*Primary Examiner* — Ramya P Burgess
*Assistant Examiner* — Timothy Hannon
(74) *Attorney, Agent, or Firm* — McCoy Russell LLP

(57) ABSTRACT

Methods and systems are provided for operating a four-wheel drive powertrain of a vehicle. In one example, a method may comprise: in response to a desired shift from a four-wheel drive mode to a two wheel-drive mode: decreasing a transfer case torque output to a secondary driveline to a lower first level and disengaging a disconnect device of the secondary driveline; increasing the transfer case torque output from the lower first level to a higher second level over a duration; and after the duration, reducing the transfer case torque.

20 Claims, 15 Drawing Sheets

FOUR-WHEEL DRIVE VEHICLE CONTROL SYSTEM AND METHODS

CROSS REFERENCE TO RELATED APPLICATIONS

The present application claims priority to U.S. Provisional Patent Application No. 62/292,130, entitled "Four-Wheel Drive Vehicle Control System and Methods," filed on Feb. 5, 2016, the entire contents of which are hereby incorporated by reference for all purposes.

TECHNICAL FIELD

The present application relates generally to systems and methods for shifting between four-wheel drive and two-wheel drive in a vehicle system.

SUMMARY/BACKGROUND

Modern vehicles often incorporate both two-wheel and four-wheel drive modes, wherein power may be selectively distributed to two wheels in the two-wheel drive mode and four wheels in the four-wheel drive mode. Vehicles of different sizes often incorporate two-wheel drive and four-wheel drive for the purpose of enabling better handling during varying traction conditions by shifting to the four-wheel drive mode, while still being able to switch to two-wheel drive when less traction is required to reduce fuel consumption and reduce wasted power.

For vehicles with switchable drive modes, devices and systems are needed for engaging and disengaging drivetrain components such as axles and shafts. For example, many vehicles having both two-wheel and four-wheel drive modes, include a transfer case for selectively distributing power output from the engine to front and rear wheels. In particular a transfer case disconnect, such as a clutch, may be included within or proximate to the transfer case for switching between the two-wheel and four-wheel drive modes. In the two-wheel drive mode, the transfer case disconnect may disengage with a secondary driveline to cut torque transmission to the secondary driveline, thereby only providing torque to the primary driveline and its wheels (e.g., either the front or rear wheels). Together, the transfer case and disconnect may transmit power output by the engine towards only two of the wheels, either the front wheels or rear wheels, during two-wheel drive mode, and towards all four of the wheels during four-wheel drive mode.

Some vehicle powertrains may include additional disconnect devices that can be placed in a variety of areas, including at the wheel ends, at one or more axles, or along one of the drive shafts, for more targeted torque delivery to each of the four wheels. For example, a powertrain may include disconnect devices in the front and/or rear axle to selectively transmit torque to each of the wheels on the front or rear axle. In particular, additional disconnect devices may be included in the secondary driveline. During the four-wheel drive mode, the secondary driveline disconnect further apportions torque received from the transfer case amongst components of the secondary driveline. For example, the secondary driveline disconnect may be positioned between the transfer case and one of the wheels of the secondary driveline to selectively transmit torque to either: only one of the wheels of the secondary driveline, or both of the wheels of the secondary driveline. By including one or more disconnect devices in the front and/or rear axle, the relative amount of torque delivered to each of the wheels of an axle may be varied. The disconnect devices often involve some form of a clutch that can move to connect or disconnect two rotatable components such as two shafts. For example, the disconnect devices may include a motor, electromagnetic coil, or other actuator that moves the clutch to connect or disconnect two rotatable components. Through the use of disconnect systems, vehicles can be made more versatile by having the ability to switch between different drive modes depending on the driving conditions and operator desire.

Typically, when a switch to 4×2 mode is commanded, the transfer case clutch moves to a disengaged position, to stop torque transmission to one of the front or rear axle. Further, when switching to, or when in a 4×2 mode, it may be desired to disengage the disconnect devices to reduce frictional losses and fuel consumption. However, the inventors herein have recognized that disconnect devices positioned in the secondary driveline may not disengage when the transfer case clutch is disengaged. Thus, the secondary driveline disconnect devices may remain engaged after the transfer case clutch is disengaged in what is referred to herein as "pinch torque." As such, components of the driveline that remain coupled by the engaged disconnect devices, such as a propeller shaft, differential, and one or more half shafts may continue to spin when in the 4×2 mode. Thus, fuel consumption may be increased in examples where the disconnect devices fail to disengage when the transfer case shifts to the 4×2 mode, due to the increased frictional losses incurred from the spinning driveline components connected by the engaged disconnect devices. The inventors herein have developed various approaches to address these issues.

Thus in one example, the above issues associated with disconnect systems may be at least partially addressed by a method comprising in response to a desired shift from a four-wheel drive mode to a two wheel-drive mode: decreasing a transfer case torque output to a secondary driveline to a lower first level and disengaging a disconnect device of the secondary driveline; increasing the transfer case torque output from the lower first level to a higher second level over a duration; and after the duration, reducing the transfer case torque.

In this way, by increasing torque input to the driveline disconnect clutch when the clutch remains engaged, the clutch may be released to the disengaged position. Thus, increasing the torque input to the driveline disconnect clutch after initially decreasing the torque input ensures that the disconnect clutch disengages and decoupled two rotating shafts. Specifically, the driveline disconnect clutch collar teeth may slide freely out of engagement with one of the shafts and may not be pinched due to residual torque and prevented from sliding and shifting to a disengaged position. The brief ramp-up of the transfer case torque releases the driveline disconnect clutch collar free of any residual torque, thereby shifting freely and without delay. By disengaging the disconnect clutch during a two-wheel drive mode, frictional drag losses and thus fuel consumption may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
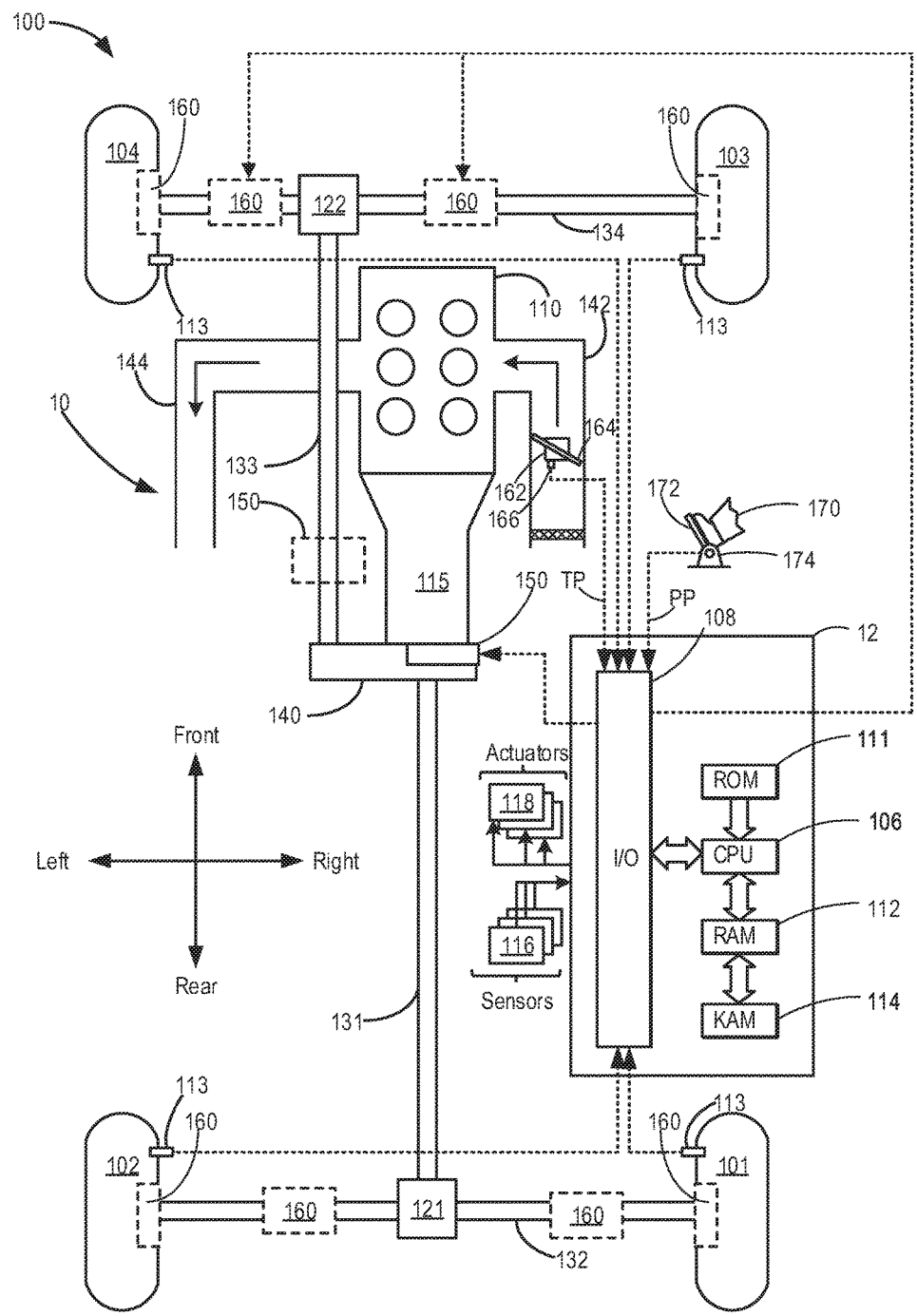
FIG. 1 shows a schematic of an example powertrain of a vehicle in accordance with the present disclosure.
Figure 2:
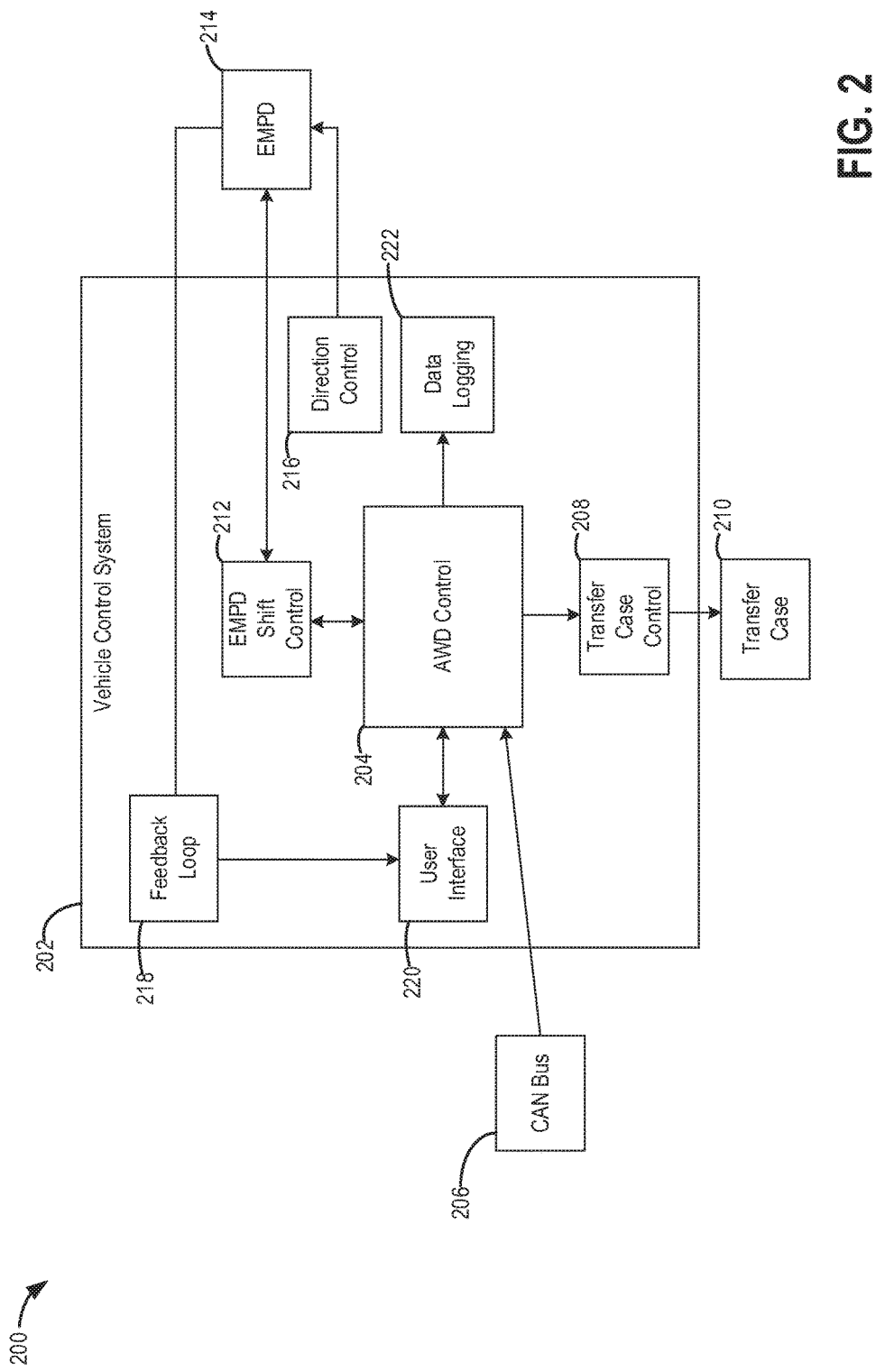
FIG. 2 shows a schematic of an example powertrain control system of a vehicle in accordance with the present disclosure.

The following detailed description relates to systems and methods for shifting between two-wheel drive and four-wheel drive modes in an on-road vehicle. An example embodiment of a vehicle powertrain is shown in FIG. 1, including an engine, a transmission, various axles and shafts, and wheels for providing motive power to the vehicle. The vehicle powertrain may be controlled by a powertrain control system, an example of which is shown in FIG. 2. Specifically, the powertrain control system may adjust operation of one or more of a transfer case and a secondary driveline disconnect device to shift between four-wheel drive and two-wheel drive modes, as described in the example method of FIG. 3. In some examples, such as the example method shown in FIG. 4, a shift between the four-wheel drive and two-wheel drive modes may be commanded by a vehicle operator. However, in other examples, such as the example method shown in FIG. 5, the powertrain may shift between two-wheel drive and four-wheel drive modes depending on vehicle operating parameters. For example, a shift to four-wheel drive mode may be commanded when a slip event is detected, as described in the example method of FIG. 6. The disconnect device may be shifted to a disengaged position during the two-wheel drive mode to reduce frictional losses and fuel consumption as described in the example method of FIG. 7.

Figure 8:
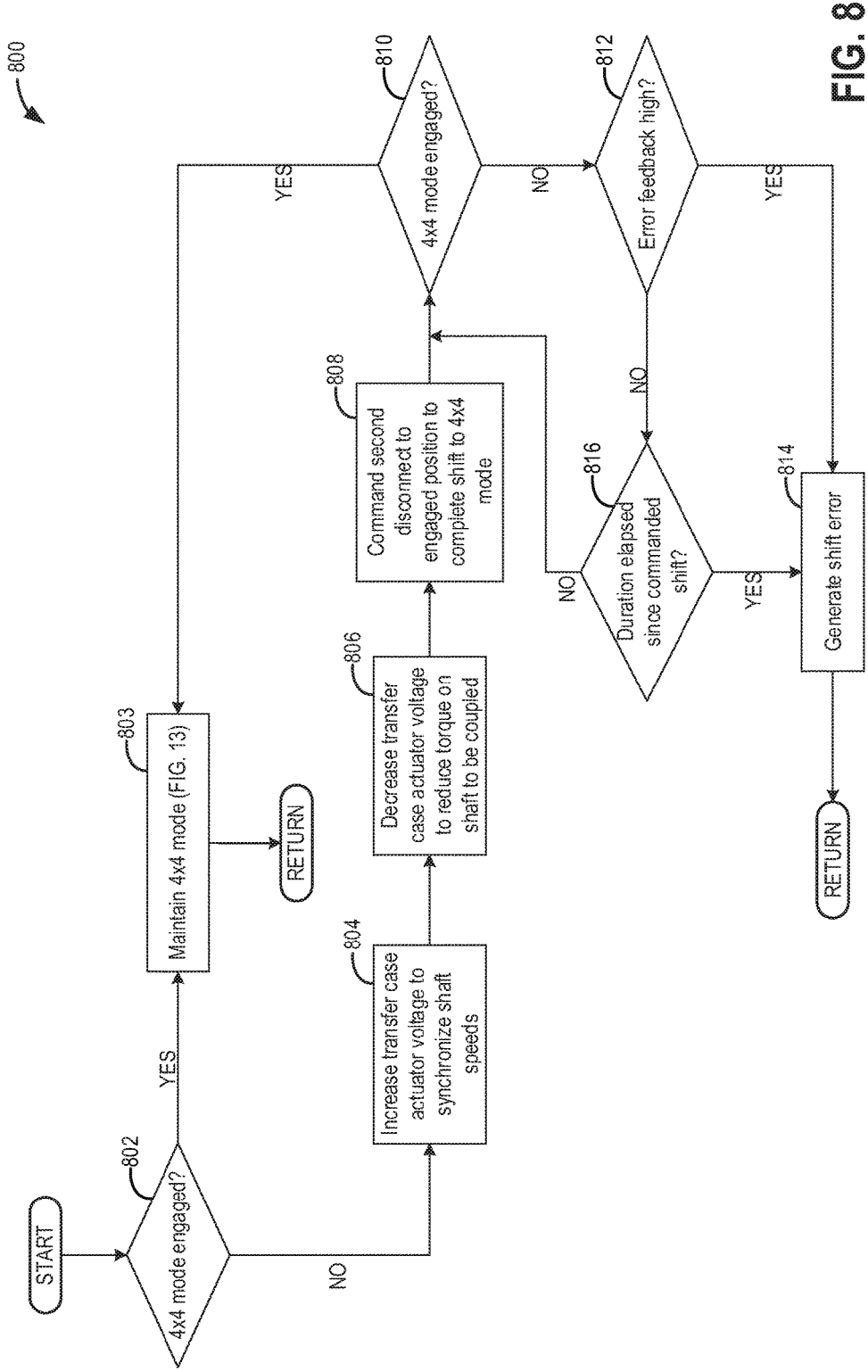
FIG. 8 shows a flow chart of an example method for shifting to a four-wheel drive mode, in accordance with the present disclosure.
Figure 9:
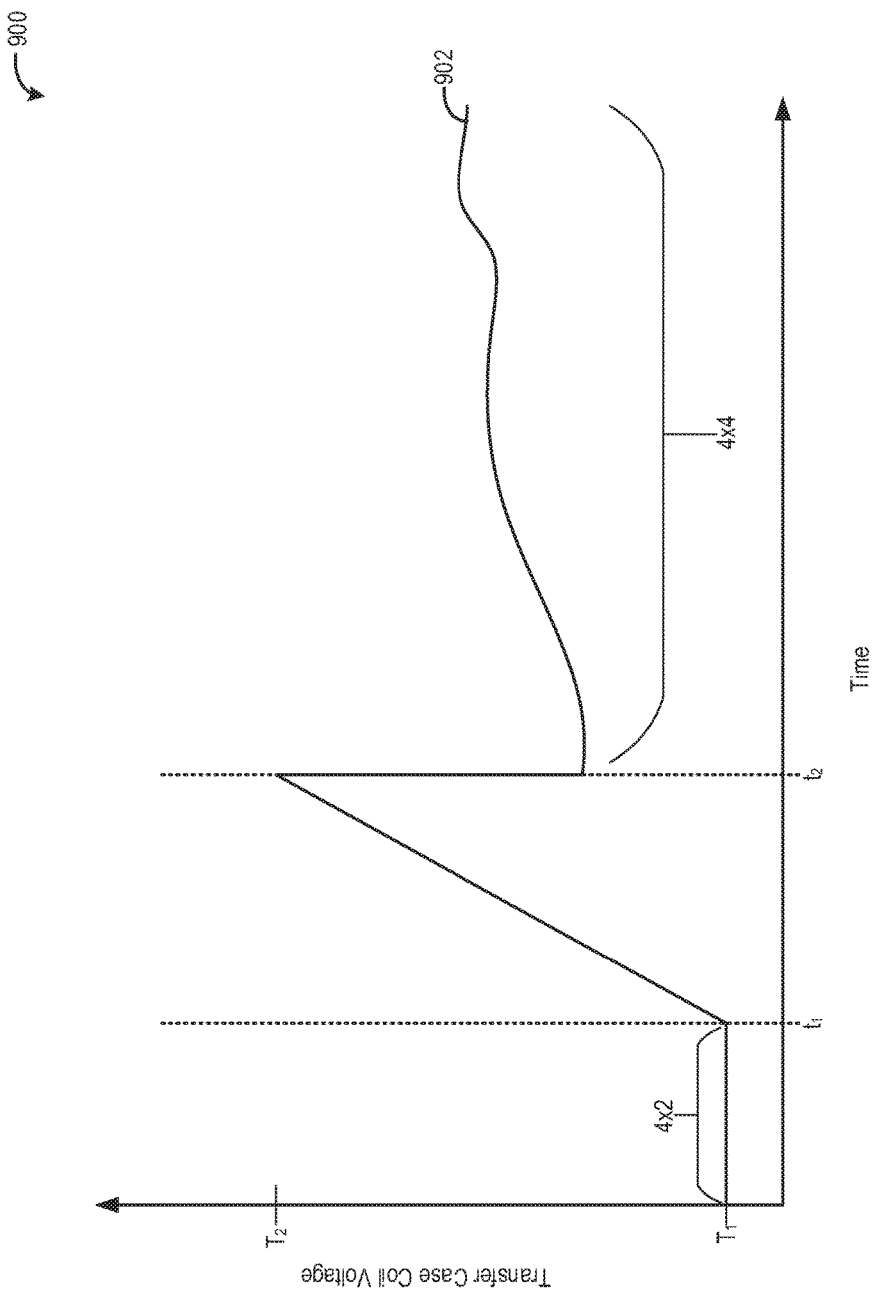
FIG. 9 shows a graph depicting example changes in torque applied to a secondary driveline component during a shift from a two-wheel drive mode to a four-wheel drive mode, in accordance with the present disclosure.
Figure 10:
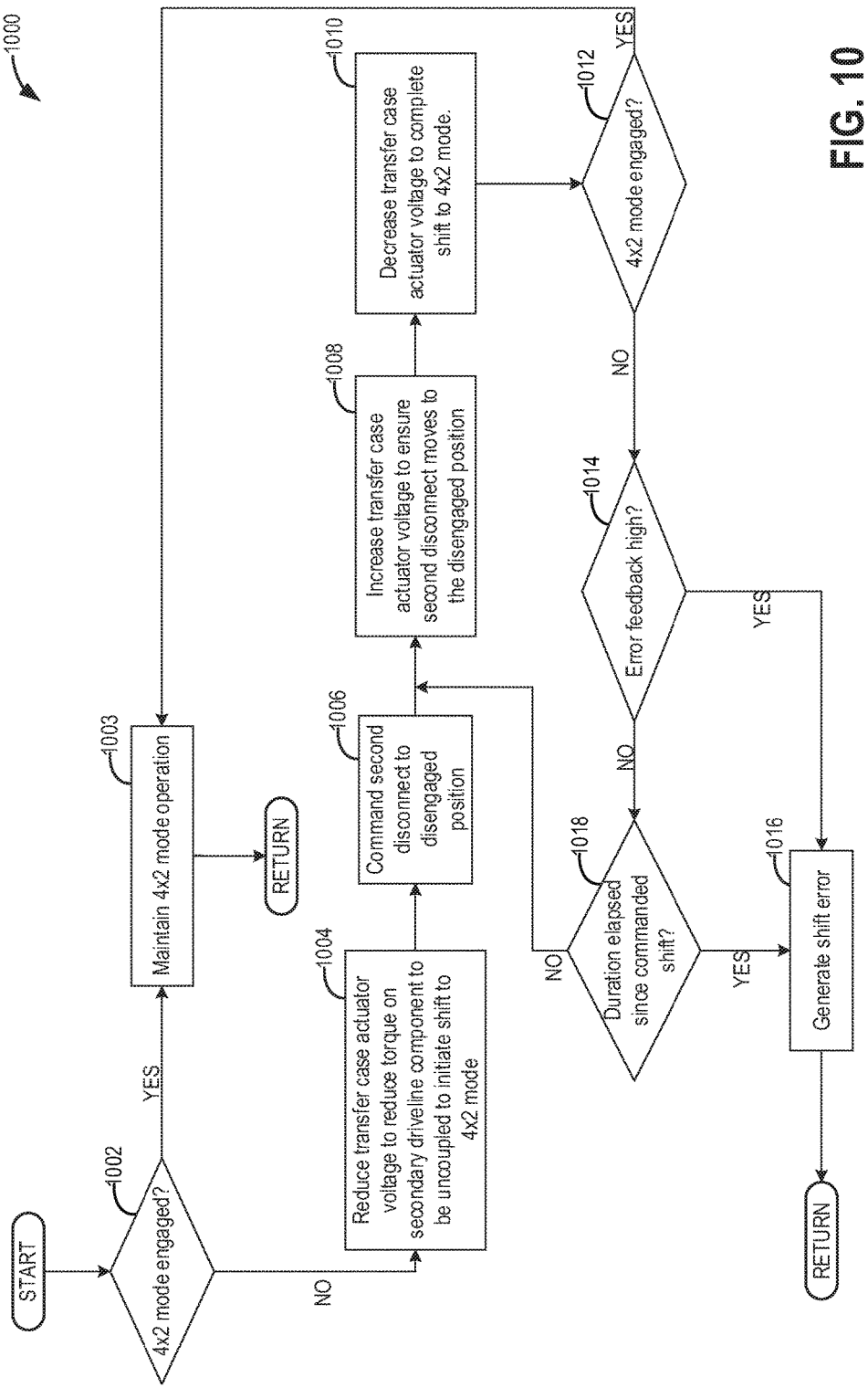
FIG. 10 shows a flow chart of an example method for shifting to a two-wheel drive mode, in accordance with the present disclosure.
Figure 11:
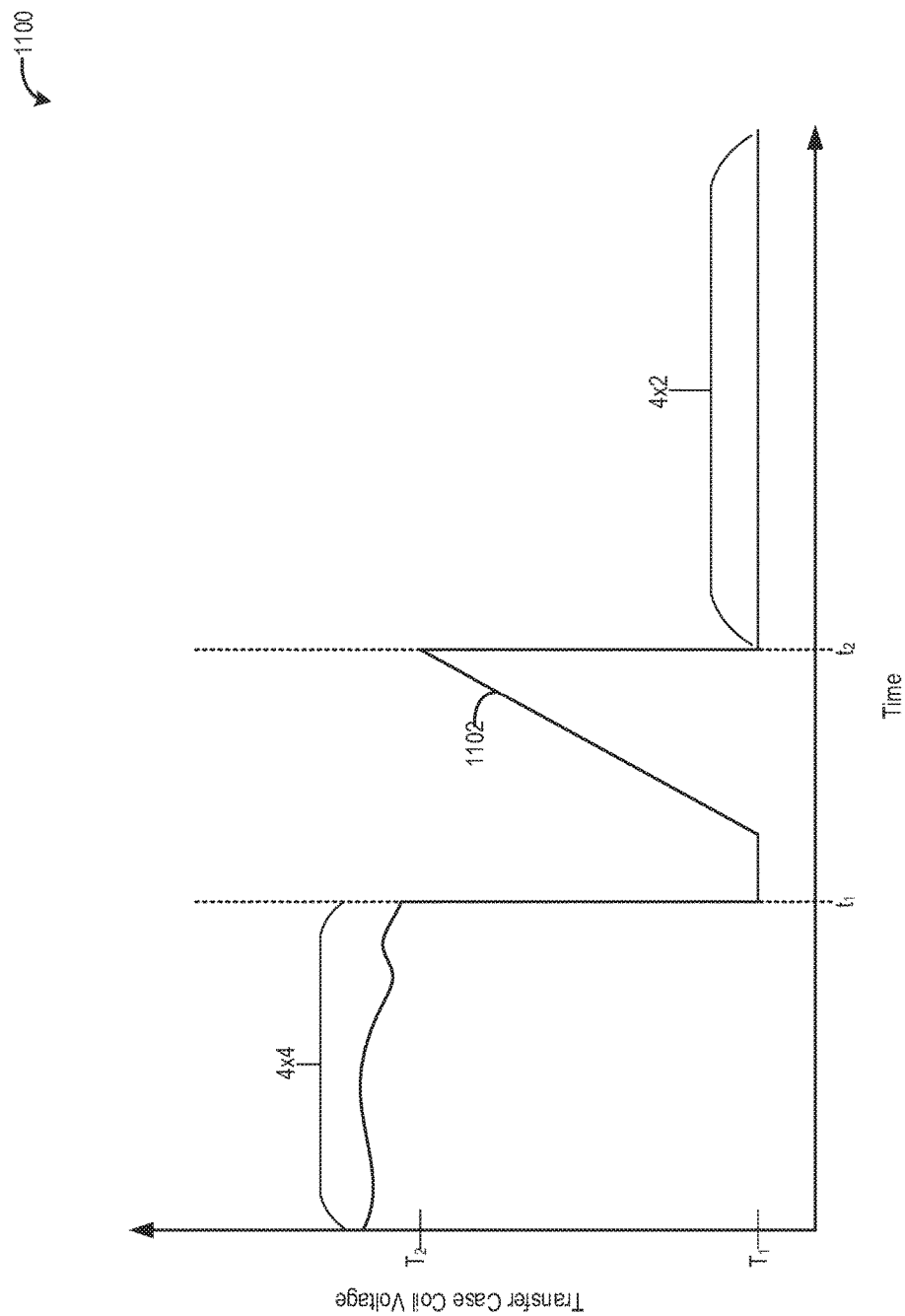
FIG. 11 shows a graph depicting example changes in torque applied to a secondary driveline component during a shift from a four-wheel drive mode to a two-wheel drive mode, in accordance with the present disclosure.
Figure 12:
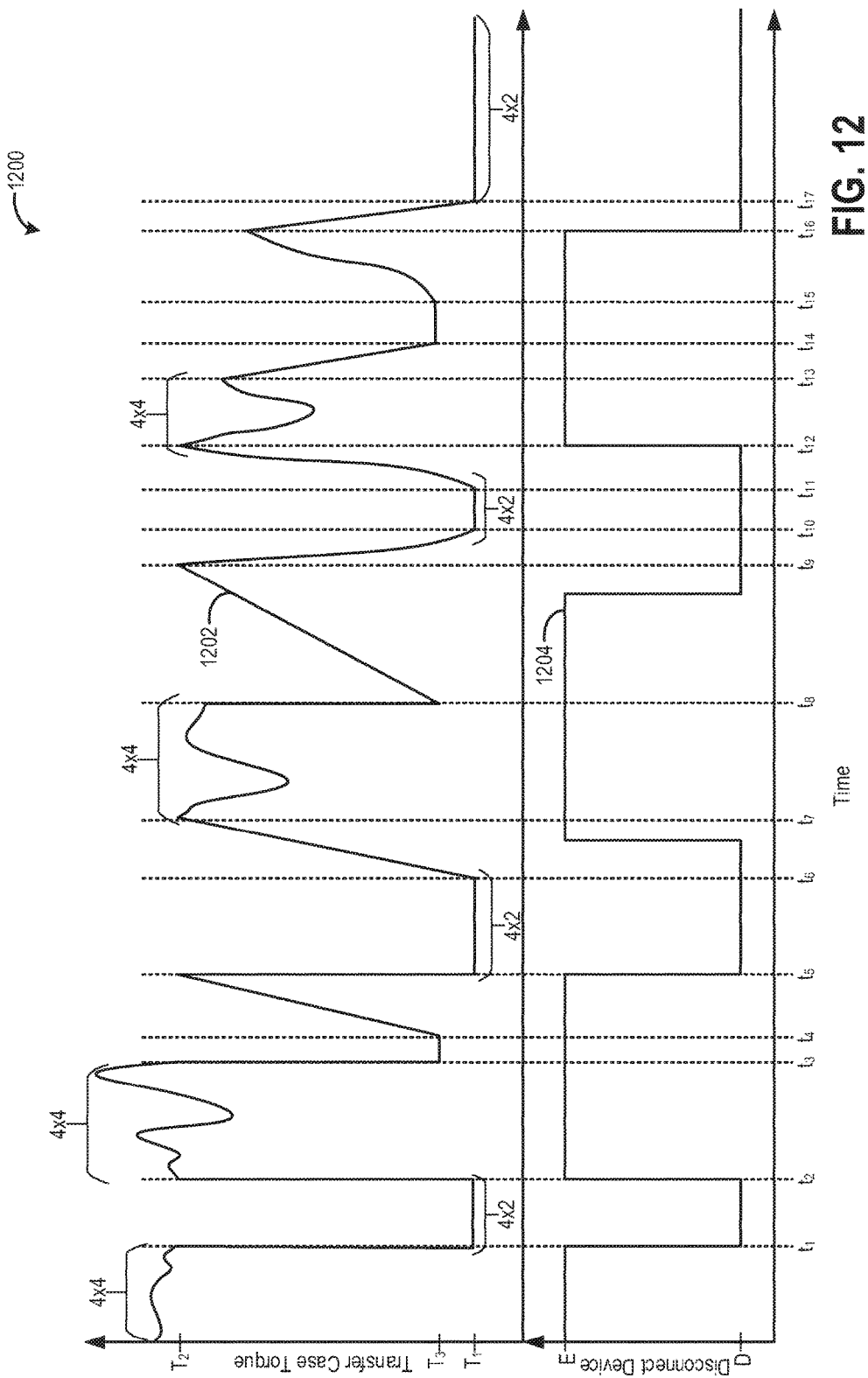
FIG. 12 shows a graph depicting example changes in torque applied to a secondary driveline component during vehicle operation, in accordance with the present disclosure.

Specifically, FIG. 8 shows an example method for controlling the transfer case and disconnect device when shifting from two-wheel drive to four-wheel drive. An example of how the transfer case torque output may be adjusted when shifting to four-wheel drive is shown in FIG. 9. Further, FIG. 10 shows an example method for controlling the transfer case and disconnect device when shifting from four-wheel drive to two-wheel drive. An example of how the transfer case torque output may be adjusted when shifting to two-wheel drive is shown in FIG. 11. FIG. 12 shows several different examples of how the transfer case torque output may be adjusted when switching back and forth between two-wheel drive and four-wheel drive modes. When in the four-wheel drive mode, the transfer case torque output may be adjusted based on vehicle operating parameters as described in the example method of FIG. 13.

Regarding terminology used throughout this detailed description, vehicle operation where only two wheels receive power from the engine may be referred to as two-wheel drive, or 2 WD, or 4×2. The corresponding position of the electromagnetic pulse disconnect may be referred to as a 4×2 position. Alternatively, vehicle operation where all four wheels receive power from the engine may be referred to as four-wheel drive, or 4 WD, or 4×4. The corresponding position of the electromagnetic pulse disconnect may be referred to as a 4×4 position. In other examples, four-wheel drive may be interchangeably referred to as all-wheel drive (AWD), wherein normally unpowered wheels may receive power during certain conditions. To accomplish shifting between 4 WD and 2 WD, the electromagnetic pulse disconnect may selectively engage two rotating components. In some embodiments, the rotating components may be axles, shafts, couplers, wheel hub assemblies, or other devices used in the drivetrain of the vehicle for transmitting rotational power.

Modern vehicles may be operated by a large variety of drivetrain systems that involve selectively powering different wheels according to different operating conditions and/or operator (i.e. driver) commands. For example, all-wheel drive vehicles may provide power to two collinear wheels during a first operating mode, and upon detection of slippage may also provide power to one or more of the remaining wheels. In other examples, a smaller vehicle, such as a passenger car, may permanently provide power to only the front two wheels of the vehicle in order to increase fuel economy (front two-wheel drive). Yet in other examples, a vehicle may be configured to selectively switch between a two-wheel drive and a four-wheel drive mode, wherein during the four-wheel drive mode all four wheels receive power. There are advantages and disadvantages to each vehicle drivetrain, and the particular utility and anticipated function of each vehicle may aid in determining which drivetrain to incorporate.

FIG. 1 shows a simple diagram of a vehicle 100 including a powertrain 10. In this diagram, the body of the vehicle 100 along with many other components are removed for better viewing of powertrain 10. It is noted that the powertrain 10 includes the components seen in FIG. 1 while a drivetrain may refer to the components of FIG. 1 excluding the engine and transmission, described further below. According to the powertrain configuration, the vehicle 100 of FIG. 1 may have a selective 4 WD drivetrain, wherein the rear wheels are powered in a rear-wheel drive mode (or 2 WD mode) and all four wheels are powered in a 4 WD mode, the 4 WD drive mode different than the 2 WD mode. Many utility vehicles such as larger trucks, all-terrain vehicles, and sports utility vehicles may incorporate rear-wheel drive rather than front-wheel drive for various reasons. One reason may be that rear-wheel drive is more conducive to load hauling or pulling, such as towing via a trailer connected to the rear of the vehicle. However, in other examples, it should be appreciated that the vehicle 100 may incorporate front-wheel drive, and as such, may only transmit power to the front wheels during 2 WD, and may then transmit torque to all four wheels during 4 WD mode.

In FIG. 1, a right rear wheel 101 and left rear wheel 102 are positioned at the rear of the vehicle 100, that is, the end located behind an operator of the vehicle 100. In this example, left, right, front, and rear orientations are given according to the perspective of an operator 170 of the vehicle 100. Directional arrows for the front, rear, left, and right orientations are shown in FIG. 1. Accordingly, a right front wheel 103 and a left front wheel 104 are positioned at the front of the vehicle 100. As shown in the example of FIG. 1, a wheel speed sensor 113 may be included at one or more of the wheels 101, 102, 103, and 104, for measuring a rotational speed of one or more of the wheels 101, 102, 103, and 104. In some examples, each of the wheels 101, 102, 103, and 104 may include a wheel speed sensor 113, and thus, four wheels speed sensors may be included in the powertrain 10. However, in other examples, more or less than four wheel speed sensors may be included. The wheel speed sensor 113 may provide an indication of the rotational speed of the wheel to which it is coupled to the controller 12. Thus, the controller 12 may estimate a speed of one or more of the wheels 101, 102, 103, and 104 based on signals received from the wheels speed sensor 113. When a difference in the speed between two or more of the wheels 101, 102, 103, and 104 is determined to be greater than a threshold, the controller 12 may detect a slip event, and may subsequently command a shift to the 4×4 mode as described in greater detail below with reference to FIG. 6.

Vehicle 100 may be controlled at least partially by a control system including controller 12 and by input from vehicle operator 170 via an input device 172. In this example, input device 172 includes an accelerator pedal and a pedal position sensor 174 for generating a proportional pedal position signal PP. Thus, the position of the accelerator pedal of the input device 172 may be determined based on outputs from the pedal position sensor 174. Specifically, the controller 12 may estimate a driver demanded torque based on a position of the input device 172 determined based on signals received from the pedal position sensor 174. In this way, vehicle operator 170 may adjust a torque output by engine 110 by depressing or releasing the accelerator pedal. Specifically, the vehicle operator 170 may request for more torque and acceleration by further depressing the accelerator pedal, and may request for less torque by releasing the accelerator pedal.

Power from the vehicle of FIG. 1 is generated by the internal combustion engine 110 having multiple cylinders. Engine 110 may receive intake air from an intake passage 142. A throttle 162 including a throttle plate 164 may be arranged in the intake passage 142 to regulate an amount of air flowing to the engine cylinders of engine 110. Specifically, the throttle plate 164 may be adjusted based on the driver demanded torque (e.g., input from vehicle operator 170 via input device 172). More specifically, the controller 12 may determine a desired position of the throttle plate 164 based on one or more of inputs received from the input device 170 and pedal position (PP) signal, a vehicle weight, road incline, transmission gear, etc. In this particular example, the position of the throttle plate 164 may be varied by the controller 12 via a signal provided to an electric motor or actuator included with the throttle 162, a configuration that is commonly referred to as electronic throttle control (ETC). In this manner, the throttle 162 may be operated to vary the intake air provided to the cylinders of the engine 110. More specifically, the throttle 162 may include an electric motor or other suitable actuator, which may be mechanically coupled to the throttle plate 164, for adjusting the position of the throttle plate 164 based on signals received from the controller 12. Thus electrical input to the throttle 162 may be converted to mechanical rotational energy, used to adjust the position of the throttle plate 164, and vary airflow to the engine 110. Products of combustion may then be exhausted to the environment via an exhaust passage 144. The exhaust passage 144 may include one or more catalysts and/or particulate filters for purifying the exhaust gasses before they reach the environment.

Engine 110 can be a fueled by gasoline or diesel according to the specific vehicle, and in the present example, engine 110 contains six cylinders configured in a V orientation, forming a V6 engine. It is understood that engine 110 may be configured in different orientations and contain a different number of cylinders while providing power in a similar fashion as seen in FIG. 1. A shaft powered by engine 110 may be directly coupled to a transmission 115 providing the necessary gearing for driving the vehicle. Transmission 115 may be a manual or automatic transmission according to the requirements of the vehicle system. A rear drive shaft 131 may be connected to transmission 115 as an output of the transmission, providing power to the rear end of the vehicle.

During the aforementioned 2 WD mode of powertrain 10, either wheels 101 and 102 are powered via a rear axle 132, or wheels 103 and 104 are powered via front axle 134. Rear axle 132 and/or front axle 134 may be a single continuous shaft in some embodiments, or may be split into two axles in a bi-axle configuration, wherein the axle is interposed with a differential. In the bi-axle configuration of the rear axle 132, a first rear axle may be positioned between a rear differential 121 and the right rear wheel 101 and a second rear axle may be positioned between the rear differential 121 and the left rear wheel 102. Similarly, in the bi-axle configuration of the front axle 134, a first front axle may be positioned between the front differential 122 and the right front wheel 103 and a second front axle may be positioned between the front differential 122 and the left front wheel 104. The rear differential 121 is also attached to rear drive shaft 131. The rear differential 121 may serve several purposes, including allowing different relative rotational speeds between wheels 101 and 102 and transferring rotation (and power) from a single direction of drive shaft 131 into two perpendicular directions of rear axle 132, as seen in FIG. 1. For example, if the vehicle is turning in the left direction, then the inboard wheel (wheel 102) may rotate at a lower speed than the rotation of the outboard wheel (wheel 101). As such, rear differential 121 may allow the two wheels to rotate at different speeds in order to avoid slipping between the wheels of the vehicle and a road that the vehicle is traveling across during a turn.

For operation of the aforementioned 4 WD mode, wherein all four wheels are driven, a system is provided to transfer power to the two wheels not receiving torque during the 2 WD mode. Specifically, in a rear-wheel drive mode of the 2 WD mode, power is output to the rear wheels 101 and 102, and not the front wheels 103 and 104. When shifting to the 4 WD from a rear-wheel drive mode of the 2 WD mode, power may be transferred to the front wheels 103 and 104 in addition to the nominally powered rear wheels 101 and 102. In a front-wheel drive mode of the 2 WD mode, power may be output to the front wheels 103 and 104, and not to the rear wheels 101 and 102. When shifting to the 4 WD mode from a front-wheel drive mode of the 2 WD mode, power may be transferred to the rear wheels 101 and 102 in addition to the nominally powered front wheels 103 and 104.

A transfer case 140 may be positioned near the output of transmission 115, and may be configured to direct power from engine 110 to one or more of front drive shaft 133 and rear drive shaft 131. The front drive shaft 133 may also be referred to herein as front propeller shaft 133 and rear drive shaft 131 may also be referred to herein as rear propeller shaft 131. In one embodiment, the transfer case 140 may utilize a chain to transfer power from the transmission 115 to one or more of the rear drive shaft 131 and front drive shaft 133.

In a similar fashion to the rear drive system, the front drive shaft 133 connects to a front differential 122. The front differential 122 may be substantially the same as rear differential 121, in that the front differential 122 allows relative rotational speeds of two wheels. As such, the front axle 134, which may be divided into two axles of a bi-axle system, may be attached to differential 122 on one end and to its respective left front wheel 104 and right front wheel 103. In this configuration, drive power from front drive shaft 133 may be transferred through front differential 122 and to wheels 103 and 104 via front axle 134. Since transfer case 140 allows power to be outputted to both the front and rear axles, the 4 WD mode may allow all four wheels to be powered simultaneously. Said another way, when the vehicle is in the 4 WD mode, both the front wheels 103 and 104 and rear wheels 101 and 102 may be driven.

For switching between 4 WD and 2 WD in the example of FIG. 1, a system is needed that selectively engages and disengages power input to the front wheels. As such, a first disconnect 150 may be provided inside transfer case 140 positioned in-line with an output shaft of transmission 115. In this configuration, first disconnect 150 may also be integrally formed with or separate from transfer case 140. Disconnects may be used in vehicles with more than one drivetrain mode and enable engaging or disengaging between two separate, rotatable input components, such as wheel hubs, axles, and drive shafts. In the present example as seen in FIG. 1, first disconnect 150 is positioned inside transfer case 140. In other vehicle systems, first disconnect 150 may be placed in a variety of locations, including on front axle 134 or on front drive shaft 133, effectively dividing the shaft into two separate lengths as seen by the dashed first disconnect 150 in FIG. 1. In other examples, the first disconnect 150 may be positioned at a power transfer unit (PTU) to enable engagement and disengagement of the PTU shaft output. Furthermore, in some embodiments, multiple disconnects may be provided, wherein each of the multiple disconnects may be fixed to a separate component of powertrain 10.

In the example of FIG. 1, first disconnect 150 may selectively connect and disconnect gears inside transfer case 140 that drive a chain that powers front drive shaft 133. As such, first disconnect 150 effectively divides transfer case 140 (and shaft 133) from the transmission 115 and rear drive shaft 131 via a system of gears, control mechanisms, and other structures, as described later in more detail. However, it should be appreciated that in other examples, the first disconnect may selectively connect and disconnect gears inside transfer case 140 that drive a chain that powers rear drive shaft 131. In such examples, first disconnect 150 effectively divides transfer case 140, and shaft 131, from the transmissions 115 and front drive shaft 133 via a system of gears, control mechanisms, and other structures, as described later in more detail.

First disconnect 150 includes an actuator that shifts the disconnect 150 between engaged and disengaged positions. In some examples, the actuator may be an electromagnetic coil, that when energized, shifts the disconnect 150 between the engaged and disengaged positions. Specifically, the coil may be operated by discrete electromagnetic pulses. Disconnects including an electromagnetic coil as the actuator providing the shifting force to adjust between be engaged and disengaged positions may be referred to herein as electromagnetic pulse disconnects (EMPDs). However, in other examples the actuator may be one or more of an electric motor, hydraulic, pneumatic, etc. Disconnects including an electric motor as the actuator may be referred to herein as motorized disconnects. In the engaged position, the disconnect 150 may couple both the front drive shaft 133 and rear drive shaft 131 with the transmission 115 and thus transmits torque from the engine 110 to both of the drive shafts 131 and 133. In the disengaged position, the disconnect 150 may couple only one of the front drive shaft 133 and rear drive shaft 131 to the transmission 115. Thus, when the disconnect 150 is shifted to the disengaged position, one of the shafts 131 or 133 may not receive power from the engine 110.

As explained above, in a rear-wheel drive mode of the 2 WD mode, the disconnect 150 may be disengaged to only provide power to rear wheels 101 and 102. Specifically, an input command received by the actuator of the disconnect 150 from the controller 12 may cause first disconnect 150 to disengage shaft 133 and transmission 115. In other words, while disengaged, front wheels 103 and 104 may rotate freely without receiving tractive power from the engine 110. Also, the rotation of wheels 103 and 104 along with the rotation of axle 134 and the portion of shaft 133 disposed in front of first disconnect 150 (as directed by the arrow in FIG. 1) may not affect the rotation of the rest of the drivetrain.

However, in the front-wheel drive mode of the 2 WD mode, the disconnect 150 may be disengaged to only provide power to front wheel 103 and 104. Specifically, an input command received by the actuator of the disconnect 150 from the controller 12 may cause first disconnect 150 to disengage shaft 131 and transmission 115. In other words, while disengaged, rear wheels 101 and 102 may rotate freely without receiving tractive power from the engine 110.

During the 4 WD mode when power is provided to all four wheels, an input command may cause first disconnect 150 to engage fixed rotation between the two lengths of shaft 133, thereby providing power to all of shaft 133 as well as axle 134. In the current example, fixed rotation may be caused by engagement between a series of gears and/or splined shafts that allows the shafts on either end of first disconnect 150 to rotate as a substantially single unit. During this operating mode, power from engine 110 power may be diverted substantially equally (or in other embodiments, non-equally) to wheels 101, 102, 103, and 104. It is noted that other drive modes are possible with the addition, change, and/or removal of components while still conforming to the scope of this disclosure.

In some examples, the powertrain 10 may include additional disconnects other than just first disconnect 150. If multiple disconnects are provided, the disconnects may be disengaged to decouple additional driveline components, and thus further reduce frictional losses from spinning driveline components.

For example, as shown in FIG. 1, powertrain 10 may include a second disconnect 160 positioned between the first disconnect 150 and one or more of the wheels 101, 102, 103, and 104. In some examples, the second disconnect 160 may be positioned at one or more wheel ends to engage and disengage individual wheels with a corresponding axle (e.g., front axle 134 and/or rear axle 132). This type of disconnect may be referred to herein as a wheel end disconnect. For example, a second disconnect 160 may be included at wheel 103 and yet another second disconnect 160 may be included at wheel 104. In such examples, front axle 134 and a portion or all of shaft 133 may cease rotating when the disconnects disengage their input components. As such, front differential 122 may also cease rotating while the disconnects disengage rotation between wheels 103 and 104 and axle 134. In this way, fuel consumption may be reduced since wheels 103 and 104 may rotate freely without the added rotational inertia (moment of inertia) of axle 134 and frictional drag of differential 122.

The second disconnect 160 may alternately be positioned on one or both of the front axle 134 and the rear axle 132. Further, the second disconnect 160 may be positioned on either side of the front differential 122 and/or the rear differential 121. For example, in one embodiment, there may be a second disconnect 160 positioned on each side (e.g., both sides) of the front differential 122 on the front axle 134. Additionally, or alternatively, there may be a second disconnect 160 positioned on each side (e.g., both sides) of the rear differential 121 along the rear axle 132. In this way, the vehicle powertrain 10 may include a dual-disconnecting differential system. The type of disconnect positioned along the front or rear axles proximate to the front or rear differentials may be referred to herein as a center disconnect.

It should be appreciated that the second disconnect 160 may be included at one or more of the positions shown in FIG. 1. Further, the second disconnect 160 may be included at positions along the axles and shafts of the powertrain 10 other than those shown in FIG. 1. For example, the second disconnect 160 may be included at any position along one or more of the axles 132 and 134. Further, the second disconnect 160 may be included in the front drive shaft 133 between the first disconnect and the front differential 122. Additionally or alternatively, the second disconnect 160 may be included in the rear drive shaft 131 between the transfer case 140 and the rear differential 121.

Further, it should be appreciated that in some examples, exactly one second disconnect 160 may be included in the powertrain 10. However, in other examples, more than one second disconnect 160 may be included in the powertrain 10.

Second disconnect 160 includes an actuator that shifts the disconnect 160 between engaged and disengaged positions. In some examples, the actuator may be an electromagnetic coil, that when energized, shifts the disconnect 160 between the engaged and disengaged positions. Specifically, the coil may be operated by discrete electromagnetic pulses. Disconnects including the electromagnetic coil as the actuator may be referred to herein as electromagnetic pulse disconnects (EMPDs). However, in other examples the actuator may be one or more of an electric motor, hydraulic, pneumatic, etc. Disconnects including an electric motor as the actuator may be referred to herein as motorized disconnects. In the engaged position, the disconnect 160 may couple rotatable input and output shafts to rotationally fix the two shafts. In the disengaged position, the disconnect 150 may decouple the input and output shafts, to permit relative rotation of the two shafts. When a shift to a 4 WD mode is commanded, the second disconnect 160 may be shifted to the engaged position, and when a shift to the 2 WD mode is commanded the first disconnect 160 may be shifted to the disengaged position. Specifically, the controller 12 may send signals to the actuator of the second disconnect 160 to shift the second disconnect 160 between the engaged and disengaged positions. The actuator of the second disconnect 160 may move a clutch ring of the second disconnect 160 into engagement with both of the input and output shafts in the engaged position, and out of engagement with one of the shafts in the disengaged position. Thus, the clutch ring may move axially along one or more of the shafts to couple and decouple the two shafts.

One or more of the disconnects 150 and 160 may include a locking device that retains the disconnect in the engaged and/or disengaged positions. As such, electrical power may only need to be supplied to the actuators of the disconnects 150 and 160 when shifting between the engaged and disengaged positions. However, in other examples, one or more of the disconnects 150 and 160 may not include a locking device, and may require that a substantially consistent stream of electrical power be provided to the actuator of the disconnect to hold the disconnect in either the disengaged or engaged position.

The disconnects 150 and 160 may be permanently coupled to respective first shafts and shift collars of each of the disconnects 150 and 160 may move to engaged positions to couple the first shafts to respective second shafts, and to disengaged positions to decouple the respective first shafts and second shafts. As described above, an amount of electrical power provided to an actuator of each of the disconnects 150 and 160 may be increased to shift the collar of each of the disconnects to the engaged position. In this way, an amount of electrical power (e.g., voltage and/or current) provided to the actuator of each of the disconnects 150 and 160 may be proportional to and/or the same or similar to the position of the clutch collar, and in some examples to the amount of torque transmitted between the first and second shafts. In some examples, the first shaft may be an input shaft that receives power from the engine 110 and the second shaft may be an output shaft that selectively receives power from the engine 110 when the disconnect is in the engaged position and does not receive power from the engine 110 when the disconnect is in the disengaged position. However, in other examples, the first shaft may be an output shaft that selectively receives power from the engine 110 when the disconnect is in the engaged position and does not receive power from the engine 110 when the disconnect is in the disengaged position and the second shaft may be an input shaft that received power from the engine 110.

In the example of FIG. 1, the input shaft for the first disconnect 150 may be a shaft coupled to the transmission 115. For example, when the vehicle is configured as a rear-wheel drive vehicle in the 2 WD drive mode, the rear drive shaft 131 may be permanently coupled to the transmission 115, and thus the input shaft for the first disconnect 150 may be the rear drive shaft 131. In such examples, the output shaft may be the front drive shaft 133. In yet further examples, where the vehicle is configured as a front-wheel drive vehicle in the 2 WD drive mode, the front drive shaft 133 may be permanently coupled to the transmission 115, and thus the input shaft for the first disconnect 150 may be the front drive shaft 133. In such examples, the output shaft may be the rear drive shaft 131. However, in other examples, where the first disconnect 150 is positioned in the front drive shaft 133, the front drive shaft 133 may be split into two axles. As such, the input shaft for the first disconnect may be the portion of the front drive shaft 133 positioned behind the disconnect 150, between the disconnect 150 and the transfer case 140. In such example, the output shaft may be the portion of the front drive shaft 133 positioned in front of the disconnect 150, between the disconnect 150 and the front axle 134.

In examples, where the second disconnect 160 is positioned in either the front axle 134 or rear axle 132, the input shaft that receives torque from the engine 110 when the first disconnect 150 is in the engaged position, may be the portion of the axle 134 or 132 positioned between the second disconnect 160 and the differential 122 or 121, respectively. The output shaft therefore may be the portion of the axle 134 or 132 positioned between the second disconnect 160 and the wheel.

Controller 12 is shown in FIG. 1 as a microcomputer, including microprocessor unit 106, input/output ports 108, an electronic storage medium for executable programs and calibration values shown as non-transitory read only memory chip 111 in this particular example for storing executable instructions, random access memory 112, keep alive memory 114, and a data bus. Controller 12 may receive various signals from sensors coupled to powertrain 10, in addition to those signals previously discussed, including measurement of inducted mass air flow (MAF) from a mass air flow sensor; throttle position (TP) from the throttle position sensor 166; accelerator pedal position from pedal position sensor 174.

The controller 12 receives signals from various sensors 116 and employs various actuators 118 to adjust engine and/or powertrain operation based on the received signals and instructions stored on a memory of the controller. The sensors 116 may include the sensors already described such as throttle position sensor 166, pedal position sensor 174, and wheel speed sensor 113, and may include additional sensors such as drive shaft speed, acceleration, yaw, brake pressure, vehicle speed, and steering angle sensors. The actuators 118 may include various electronically controlled actuators, such as motors, electromagnetic coils, vacuum actuators, etc. The actuators 118 may be included in various powertrain components to adjust the operation thereof. For example, an electromagnetic coil assembly may be included in one or more of the first disconnect 150 and second disconnect 160 for shifting the disconnects 150 and 160 between the respective engaged and disengaged positions.

More specifically, and as described in greater detail below with reference to FIGS. 3-15, the controller 12 may adjust operation of one or more of the first disconnect 150 and second disconnect 160 based on signals received from the sensors 116 and input from the vehicle operator 170 via the input device 172. Specifically, the controller 12 may send signals to respective actuators of the first disconnect 150 and/or second disconnect 160 to adjust the one or more disconnects 150 and 160 between engaged and disengaged positions. For example, when more traction is desired, such as during increased acceleration when the vehicle operator 170 depresses the input device 172 (e.g., greater driver demanded torque), or during cornering, vehicle or wheel slip conditions, etc., the controller 12 may determine that a shift to a 4×4 mode is desired and may send signals to the actuators of the disconnects 150 and/or 160 to adjust the disconnects 150 and/or 160 to their respective engaged positions to couple input and output shafts. When less traction is desired, such as at higher vehicle speeds and/or when driver demanded torque is less, the controller may determine that a shift to a 4×2 mode is desired and may send signals to the actuators of the disconnects 150 and/or 160 to adjust the disconnects 150 and/or 160 to their respective disengaged positions to decouple input and output shafts, and thereby reduce fuel consumption.

Turning now to FIG. 2, it shows a schematic 200 of an example vehicle control system 202 that may be included in a vehicle powertrain, such as the powertrain 10 described above with reference to FIG. 1, for control thereof. Vehicle control system 202 includes an all-wheel drive (AWD) control module 204 that may communicate with other vehicle control modules via a CAN bus 206 network. The AWD control module 204 may communicate with a transfer case control module 208 that adjusts operation of a transfer case 210. For example, the transfer case control module 208 may include a printed circuit board (PCB) that receives control signals from the AWD control module 204 and adjusts a current and/or voltage supplied to an actuator, such as an electromagnetic coil or motor, of the transfer case 210, as explained in greater detail below with reference to FIGS. 8, 10, and 13.

Further, AWD control module 204 may communicate with an electromagnetic pulse disconnect (EMPD) shift control module 212. The EMPD shift control module 212 may adjust operation of an EMPD 214. As explained above with reference to FIG. 1, the EPMD 214 may include an electromagnetic coil, that when energized, for example via current and/or voltage provided by the EMPD shift control module 212, shifts the EMPD 214 between engaged and disengaged positions as explained in greater detail below with reference to FIGS. 7, 8, and 10. Thus, the EMPD shift control module 212 may include a printed circuit board (PCB) that receives control signals from the AWD control module 204 and adjusts a current and/or voltage supplied to an actuator such, as an electromagnetic coil, of the EMPD 214. Additionally, a direction control module 216, may send signals to the EMPD 214, to adjust operation of the EMPD 214 based on a direction that the vehicle is moving as explained in greater detail below with reference to FIG. 14.

A current operating state of the EMPD 214 may be communicated to a feedback loop 218. Based on signals received from the EMPD 214, the feedback loop 218, may generate a signal indicating whether a desired shift to a 4×4 or 4×2 mode has been completed, or if there is a shift error, as described in greater detail below with reference to FIG. 15. The shift error signal may be sent to a user interface 220 to alert a vehicle operator of a shift error. The user interface 220 may enable a vehicle operator (e.g., operator 170 described above in FIG. 1) to adjust operation of the vehicle control system. Specifically, the vehicle operator may manually switch the vehicle between 2 WD and AWD modes as described in greater detail below with reference to FIG. 4.

Thus, the user interface 220 may comprise one or more of keyboards, buttons, switches, touch screens, and may additionally include one or more display screens, such as LCD, LED, plasma, etc. As such, a current operating status of the EMPD 214, and/or an indication of a shift error may be presented to the operator on the display screen of the user interface 220.

The AWD control module 204 may further communicate with a data logging module 222. The data logging module 222 may comprise read only memory (ROM), random access memory (RAM), keep alive memory (KAM), or other form of data storage such as EPROM, EEPROM, etc., for storing vehicle data, such as commands sent to various actuators of the vehicle and/or measurements received from various sensors of the vehicle. Further, the data logging module 222 may temporarily and/or permanently store computer readable instructions and/or vehicle data.

In some examples, a current operating state and/or fault condition of one or more the EMPD 214 and transfer case 210 may be communicated back to the AWD control module 204. For example, one or more the EMPD 214 and transfer case 210 can detect various faults and report them to the AWD control module 204. The AWD control module 204 may include one or more of a central processing unit, data storage, non-transitory memory, PCB, etc. The AWD control module 204 may determine that the EMPD 214 and/or transfer case 210 is not in the current desired drive mode when one or more of the driveline disconnect hasn't shifted within a threshold duration, the driveline disconnect shift was improper, an electrical fault has occurred in the driveline disconnect circuitry, etc. The EMPD 214 may report a fault message or use a coding scheme to report each different type of fault. If a fault occurs, the EMPD 214 may use a countermeasure algorithm to correct the fault. The counter measure may include an extended duration or repeating shift command.

Further, the AWD control module 204 may detect a panic braking condition by detecting a spike in the brake pressure or sudden deceleration of the wheels or the vehicle body. If such a condition is detected, the AWD control module 204 may initiate a disconnect shift to the 4×4 state in priority over other variables that would normally command a 4×2 state. This method may be useful in assuring that the EMPD 214 is in the 4×4 state after a rapid deceleration and subsequent stop. The various levels, factors, and set-points used by the AWD control module 204 to make control decisions may be saved in computer memory as a configuration file. Several different configuration files may exist with different set-point values. A particular configuration file may be called to action by the AWD control module 204 according to conditional requirements or by driver selection. The AWD control module 204 may detect special conditions like cold temperature start-up, hot temperature start-up, towing, etc. and switch to a special control algorithm tailored to that condition.

Turning now to FIGS. 3-8, 10, and 13-15, they show flow charts of example methods for controlling a vehicle powertrain, such as powertrain 10 described above with reference to FIG. 1. Thus, the methods described below in FIGS. 3-8 10, and 13-15 may be executed at least partially by a vehicle control system, such as the vehicle control system 202 described above in FIG. 2. As such, FIGS. 3-8, 10, and 13-15 may be described together in the description herein. Operation of one or more of a second disconnect device (e.g., second disconnect 160 described above in FIG. 1) and a first transfer case disconnect (e.g., first disconnect 150 described above in FIG. 1) may be adjusted when shifting between two-wheel drive and four-wheel drive modes as described in FIG. 3. As described in FIG. 4, a shift between the drive modes may be commanded by a vehicle operator. However, in other examples, a shift between the drive modes may be initiated based on changes in vehicle operating conditions as described in FIGS. 5-6. Example control operations for the disconnect device are described below in FIG. 7. FIG. 8 describes example control operations when shifting to the four-wheel drive mode, and FIG. 10 describes example control operations when shifting to the two-wheel drive mode. Operation of the transfer case and the first transfer case disconnect in four-wheel drive mode is described in FIG. 12.

Instructions for executing one or more of the methods described in FIGS. 3-8, 10, and 13-15 may be stored in the memory of a vehicle controller (e.g., controller 12 described above in FIG. 1). Therefore the methods described in FIGS. 3-8, 10, and 12-14 may be executed by the controller based on the instructions stored in the memory of the controller and in conjunction with signals received from sensors of the vehicle system, such as wheel speed sensors (e.g., wheel speed sensor 113 described above in FIG. 1), throttle position sensor (e.g., throttle position sensor 166 described above in FIG. 1), accelerator pedal position sensor (e.g., pedal position sensor 174 described above in FIG. 1), acceleration sensor, yaw sensor, steering angle sensor, brake pressure sensor, vehicle speed sensor, etc. The controller may send signals to actuators of one or more of the second disconnect device and transfer case disconnect, to adjust operation thereof. Specifically, each of the transfer case disconnect and second disconnect may include an electromagnetic coil or motor that when energized shifts the disconnect between its engaged and disengaged positions. Thus, a current and/or voltage may be supplied to the coil or motor of the disconnects when shifting to the engaged positions, such as during a shift to an AWD mode, and when shifting to the disengaged positions, such as during a shift to a 2 WD mode.

Figure 3:
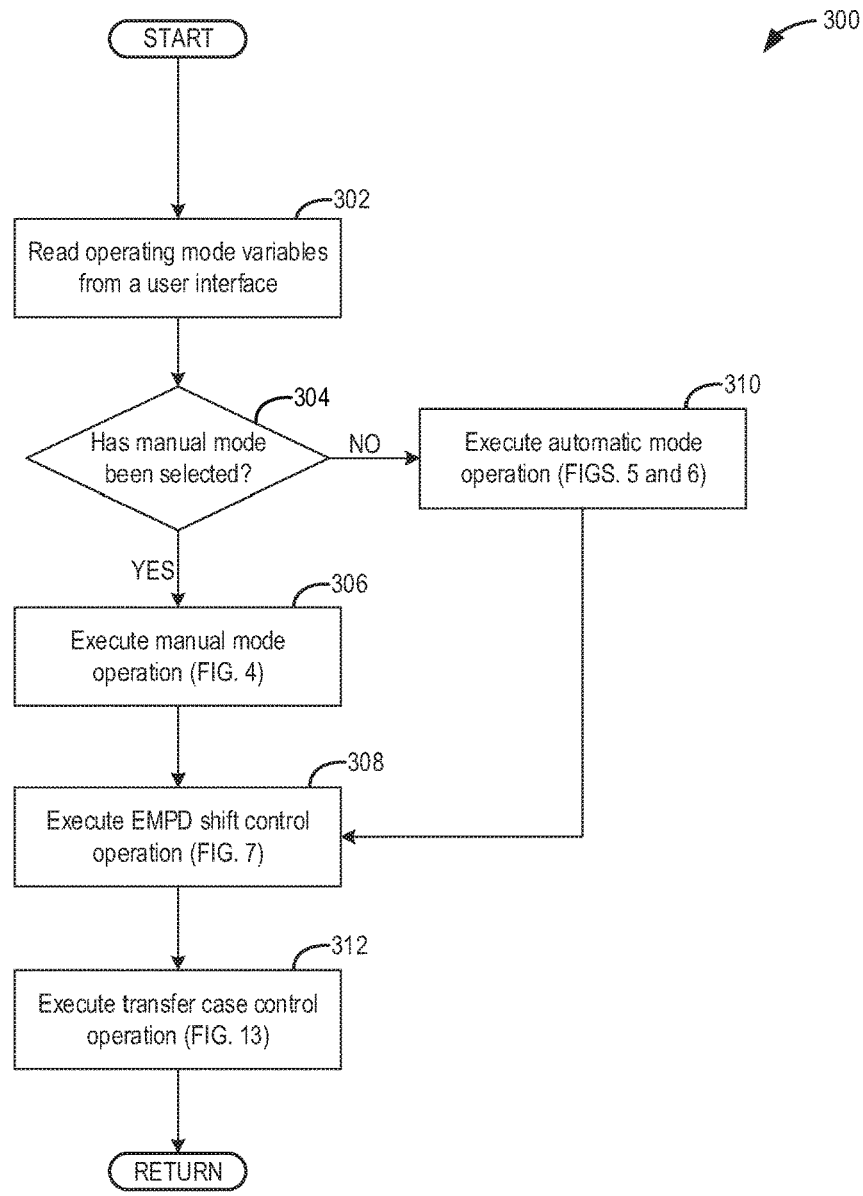
FIG. 3 shows a flow chart of an example method for controlling a powertrain of a vehicle, such as the powertrain shown in FIG. 1, in accordance with the present disclosure.

Focusing on FIG. 3, it shows a flow chart of an example method 300 for controlling operation of various components of the vehicle powertrain during vehicle operation. Method 300 may begin at 302 which comprises reading operating mode variables from a user interface (e.g., user interface 220 described above in FIG. 2). The method 300 may then proceed from 302 to 304, which comprises determining if a manual mode has been selected based on the operating mode variables read from the user interface at 302. Thus, if an operator has selected the manual mode selection via the user interface, method 300 may continue from 304 to 306 which comprises executing manual mode operation, such as the example manual mode operation described below with reference to FIG. 4. Thus, method 300 at 306 may comprise executing the method 400 described below in FIG. 4.

Method 300 may then proceed from 306 to 308 which comprises executing EMPD shift control, such as the EMPD shift control method described below with reference to FIG. 7. Thus, method 300 at 308 may comprise executing the method 700 described below in FIG. 7. Alternatively, method 300 may execute the EMPD shift control at 308 in an automatic mode. For example, if manual mode is not selected at 304, method 300 may continue from 304 to 310 which comprises executing an automatic mode, such as the automatic mode control method described below with reference to FIGS. 5-6. Thus, the method 300 at 310 may comprise executing the methods 500 and 600 described in FIGS. 5 and 6, respectively. Method 300 may then continue from 310 to 308 and execute the EMPD shift control.

Further, method 300 may continue from 308 to 312, which comprises executing transfer case control, such as the transfer case control method described below with reference to FIG. 13. Thus, the method 300 at 312 may comprise executing method 1300 described below in FIG. 13. Method 300 may then return. In this way, the EMPD shift control and transfer case control may be executed in either a manual mode via input from a vehicle operator, or in an automatic mode. Thus, shifts between 2 WD and AWD modes may be commanded either by the vehicle operator, or by a controller based on vehicle operating conditions.

Figure 4:
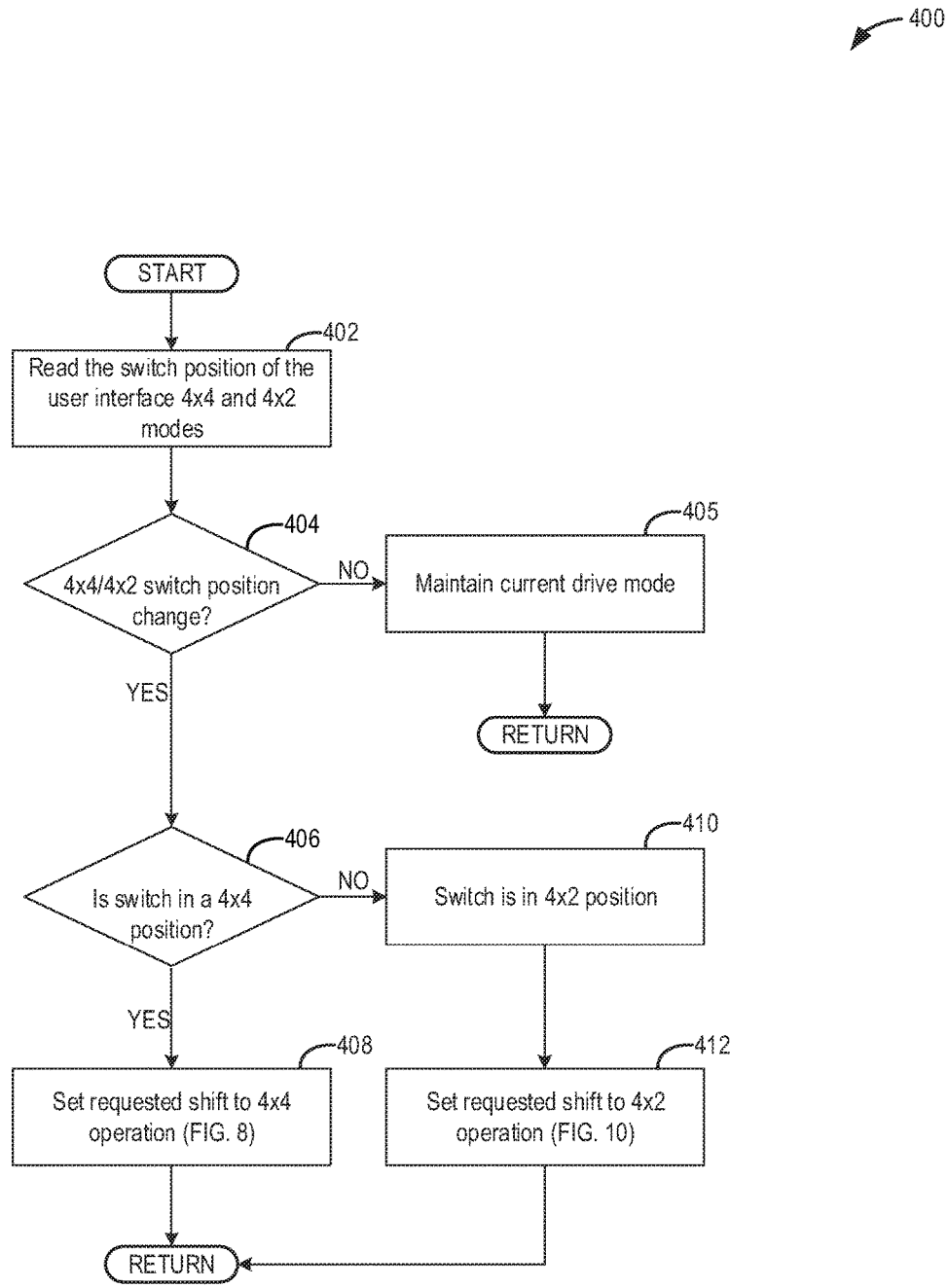
FIG. 4 shows a flow chart of an example method for controlling a powertrain of a vehicle, such as the powertrain shown in FIG. 1, based on input from a vehicle operator, in accordance with the present disclosure.

Moving on to FIG. 4, it shows a flow chart of an example method 400 for controlling a powertrain in a manual mode, based on user input. In particular, FIG. 4 show an example method for executing a vehicle operator initiated shift between 4×2 and 4×4 modes. Thus, method 400 may be executed as a subroutine of method 300 at 306, as described above in FIG. 3. Method 400 begins at 402 which comprises reading the switch position of the user interface 4×4 and 4×2 modes. For example, a user may flip a switch to shift between 4×4 and 4×2 modes. In another example, a user may select between the 4×4 and 4×2 modes by pressing buttons or selecting touch screen options on the user interface. Thus, the method 400 at 402 comprises reading a position of a user interface device to determine if the operator commands a 4×4 mode or 4×2 mode. Method 400 thus continues from 402 to 404 which comprises determining if the user interface 4×4/4×2 switch has changed position. If the user interface switch has not changed positions, then method 400 continues from 404 to 405 which comprises maintaining the current drive mode (e.g., two-wheel drive or four-wheel drive mode). Method 400 then returns. However, if the user interface button has changed position, then method 400 continues from 404 to 406 which comprises determining if the switch is in the 4×4 position. If the switch is in the 4×4 position, then method 400 continues to 408 which comprises setting a requested shift to 4×4. Thus, at 408 one or more of the transfer case disconnect and second disconnect may be commanded to their engaged positions. Method 400 then returns.

However, if at 406 the switch is not in the 4×4 position, then method 400 proceeds from 406 to 410, which comprise determining that the switch is in the 4×2 position. Thus, if the switch is not in the 4×4 position, then the switch may instead be in the 4×2 position. Method 400 then continues from 410 to 412 which comprises setting a requested shift to 4×2 operation. Thus, at 412 one or more of the transfer case disconnect and second disconnect may be commanded to their disengaged positions. Method 400 then returns.

Figure 5:
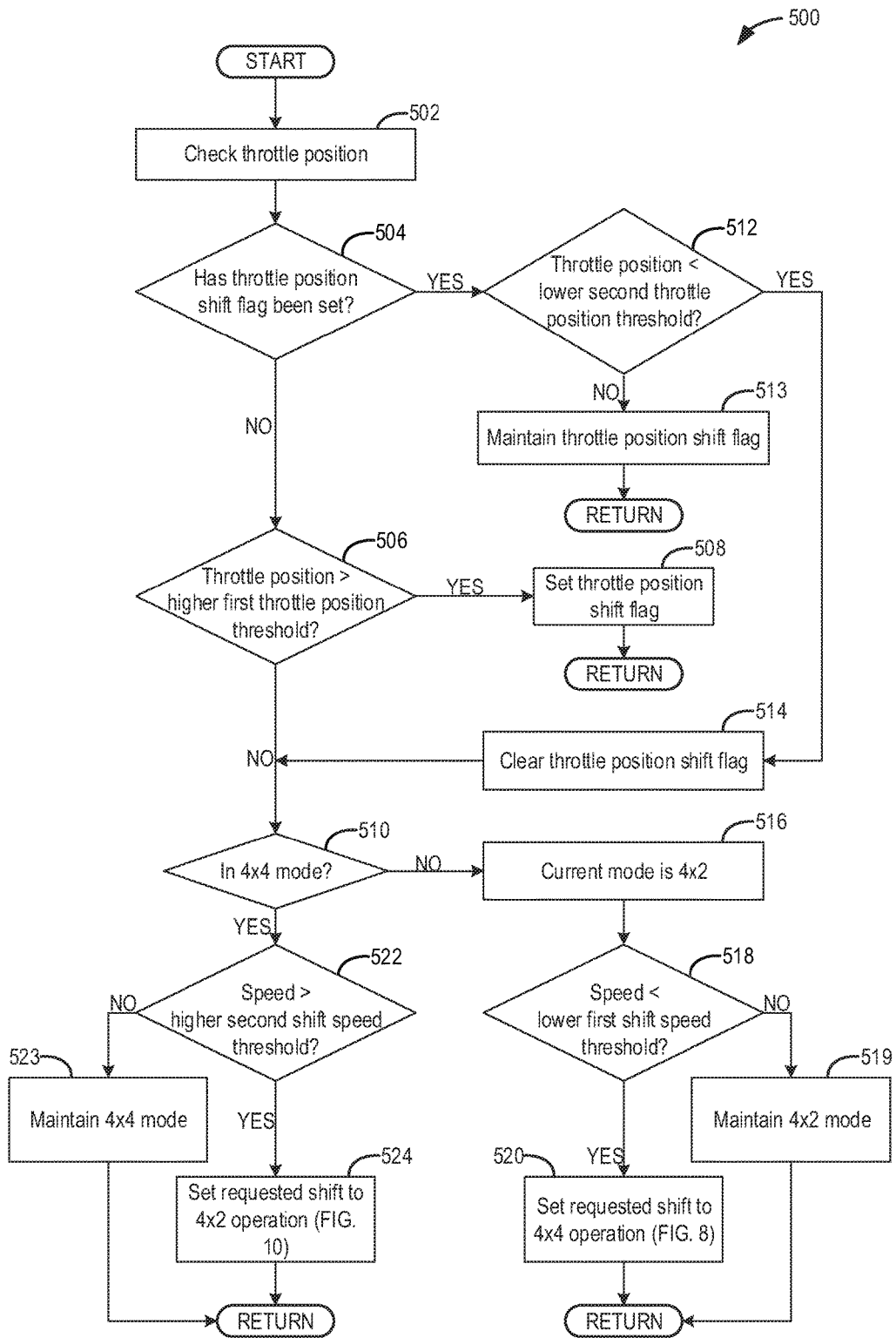
FIG. 5 shows a flow chart of an example method for controlling a powertrain of a vehicle, such as the powertrain shown in FIG. 1, based on vehicle operating parameters, in accordance with the present disclosure.

Moving on to FIG. 5, it shows a flow chart of an example method 500 for controlling a powertrain in an automatic mode based on vehicle operating conditions. In particular, FIG. 5 show an example method for determining when to shift between the 4×2 and 4×4 modes based on engine operating conditions. Thus, method 500 may be executed as a subroutine of method 300 at 310, as described above in FIG. 3. Method 500 begins at 502 which comprises checking throttle position. Throttle position may be checked via outputs received from the throttle position sensor (e.g., throttle position sensor 166 described above in FIG. 1).

Based on the determined throttle position, method 500 may continue from 502 to 504 which comprises determining if a throttle position shift flag has been set. The throttle position shift flag, when set, may prevent the vehicle from exiting the 4×4 mode. Thus, when set, the first throttle position shift flag may maintain the vehicle in the 4×4 mode. In this way, greater traction may be delivered during tip-in events where the throttle position increases (e.g., where an operator depresses the accelerator pedal) and/or during increased desired acceleration, or other operating conditions where more traction is desired. Thus, the throttle position may decrease for decreases in the driver demanded torque (e.g., where operator releases the accelerator pedal). If the throttle position shift flag has not been set, method 500 may continue from 504 to 506 which comprises determining if the throttle position determined at 502 is greater than a higher first throttle position threshold, above which the throttle position shift flag may be set. If the throttle position is greater than the higher first throttle position threshold at 506, then method 500 may continue from 506 to 508 which comprises setting the throttle position shift flag. Method 500 then returns. However, if it is determined at 506 that the current throttle position is not greater than the higher first throttle position threshold, then method 500 continues from 506 to 510 which comprises determining if the current drive mode is the 4×4 mode.

Alternatively, method 500 may reach 510 from 504, if it is determined at 504 that the throttle position shift flag has been set. Thus, if the throttle position shift flag has been set, method 500 may proceed from 504 to 512, which comprises determining if the throttle position is less than a lower second throttle position threshold. The lower second throttle position threshold is lower than the higher first throttle position threshold, and thus represent a more closed throttle position the higher first throttle position threshold. Thus, the lower second throttle position threshold may represent a lower driver demanded torque level than the higher first throttle position threshold. If the current throttle position is not less than the lower second throttle position threshold, then the method 500 continues from 512 to 513 which comprises maintaining the throttle position shift flag. In this way, the throttle position shift flag may be maintained, and therefore the vehicle may be maintained in the 4×4 mode, for transient drops in throttle position below the higher first throttle position threshold. After maintaining the throttle position shift flag at 513, method 500 then returns. However, if the current throttle position is less than the lower second throttle position threshold, then method 500 continues from 512 to 514 which comprises clearing the higher first throttle position flag. Method 500 then continues from 514 to 510.

At 510, if it is determined that the current mode is not 4×4, then method 500 may continue to 516 which comprises determining that the current mode is 4×2. After determining that the current mode is 4×2, method 500 may proceed from 516 to 518, which comprises determining if the current vehicle speed is less than a lower first shift speed threshold. If the current vehicle speed is not less than the lower first shift speed threshold, then method 500 continues from 518 to 519 which comprises maintaining the 4×2 mode. After maintaining the 4×2 mode, method 500 then returns. Thus, if the vehicle speed is greater than the lower first shift speed threshold, the vehicle may remain in the 4×2 mode.

However, if the current vehicle speed is less than the lower first shift speed threshold, then method 500 continues from 518 to 520 which comprises setting a requested shift to a 4×4 mode. Thus, at 520 one or more of the transfer case disconnect and second disconnect may be commanded to their engaged positions. In this way, if the vehicle is below a certain road speed, the driveline disconnect will shift into the AWD mode. This provides 4×4 at lower speeds where increased traction is desired. It also may assure that the vehicle is in 4×4 when the vehicle comes to a stop, thereby providing 4×4 when the vehicle accelerates from a stop. Further, if the vehicle starts from a lower speed in 4×4 then accelerates to a higher speed in which a 4×2 shift normally occurs, the shift will be delayed until the acceleration drops below a threshold. This provides 4×4 during acceleration where increased traction is desired. Acceleration may be determined by any combination of vehicle sensors including but not limited to the throttle position sensor. Method 500 then returns after requesting the shift to 4×4 at 520.

Returning to 510, if it is determined that the current mode is 4×4, then method 500 may proceed from 510 to 522 which comprises determining if the current vehicle speed is greater than a higher second shift speed threshold, the higher second shift speed threshold representing a vehicle speed greater than the vehicle speed represented by the lower first shift speed threshold. If the current vehicle speed is not greater than the higher second shift speed threshold, then method may continue from 522 to 523 which comprises maintaining the 4×4 mode. After maintaining the 4×4 mode, method 500 then returns. Thus, if the vehicle speed is not greater than the higher second shift speed threshold, the vehicle may remain in the 4×4 mode. However, if it is determined at 522 that the current vehicle speed is greater than the higher second shift speed threshold, then method 500 continues from 522 to 524 which comprises setting a requested shift to the 4×2 mode. Thus, at 524 one or more of the transfer case disconnect and second disconnect may be commanded to their disengaged positions. In this way, if the vehicle is above a certain road speed, the driveline disconnect will shift into the 4×2 mode. This may provide 4×2 when the vehicle is traveling in a way where lower traction is acceptable and improved driveline efficiency is desired. Method 500 then returns after requesting the shift to 4×2 at 524.

Figure 6:
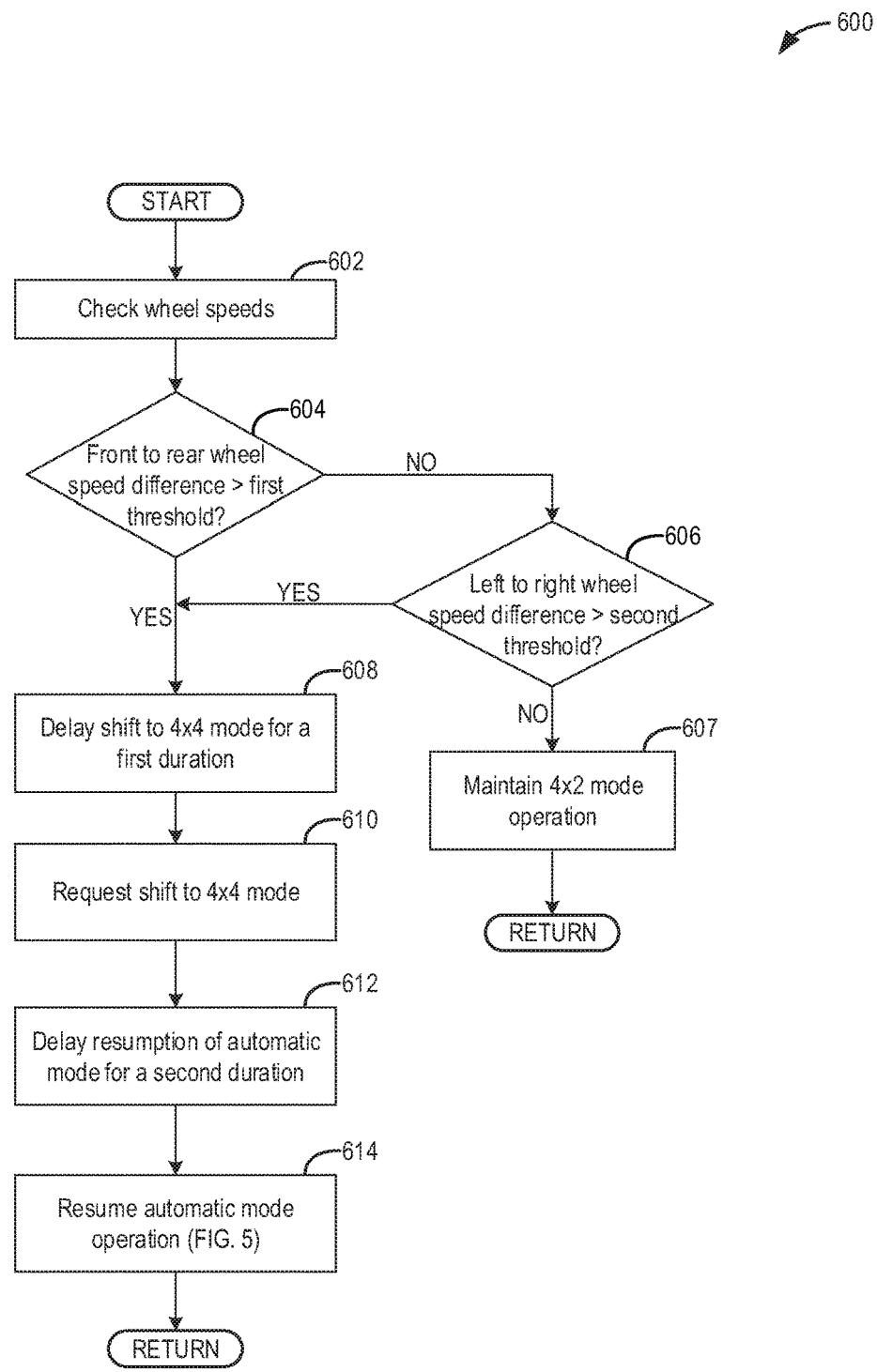
FIG. 6 shows a flow chart of an example method for shifting to a four-wheel drive mode when a slip event is detected, in accordance with the present disclosure.

Turning now to FIG. 6, it shows a flow chart of an example method 600 for detecting a vehicle slip event and controlling powertrain operation when two rotating components of the driveline are rotating at speeds greater than a threshold relative to one another. Method 600 may be executed during an automatic mode, such as the automatic mode described above with reference to method 500 of FIG. 5. Thus, method 600 and method 500 may be executed approximately in parallel.

Method 600 begins at 602 which comprises checking wheel speed. Wheel speed may be determined based on outputs received from one or more wheel speed sensors (e.g., wheel speed sensor 113 described above in FIG. 1). Method 600 then continues from 602 to 604 which comprises determining if the difference in wheel speed between front wheels (e.g., front wheels 103 and 104 described above in FIG. 1) and rear wheels (e.g., rear wheels 101 and 102 described above in FIG. 1) is greater than a first threshold. If the difference in rotational speed of the front wheels compared to the rear wheels is not greater than the first threshold at 604, method 600 may continue from 604 to 606 which comprises determining if the difference in speed of a rear left wheel (e.g., left rear wheel 102 described above in FIG. 1) and rear right wheel (e.g., right rear wheel 101 described above in FIG. 1) is greater than a second threshold. In other examples, the method 600 at 606 may additionally or alternatively comprises determining if the difference in speed of a front left wheel (e.g., left front wheel 104 described above in FIG. 1) and front right wheel (e.g., right front wheel 103 described above in FIG. 1) is greater than a third threshold. In some examples, the second and third thresholds may be the same. However, in other examples, they may be different. If the difference in speed between the left and right wheels is not greater than the threshold at 606, then method 600 continues from 606 to 607 which comprises maintaining the 4×2 mode. After maintaining the 4×2 mode, method 600 returns.

However, if it is determined at 606 that the difference in speed between the left and right wheels is greater than the threshold at 606, then a slip event may be detected, and method 600 may continue from 606 to 608 which comprises delaying a shift to a 4×4 mode for a first duration. The first duration may be an amount of time such as 50 ms. However, in other examples, the first duration may be greater or less than 50 ms. However, in other examples, the duration may be a number of engine cycles, number of wheel rotations, etc. In yet further examples, the duration may be adjusted based on vehicle and/or engine operating conditions. Alternatively, if it is determined at 604 that the difference in speed between the front wheels and rear wheels is greater than the first threshold, then method 600 may detect a slip event and may continue from 604 to 608 and delay for the first duration.

After waiting the first duration, method 600 may then continue from 608 to 610 and request a shift to the 4×4 mode. However, method 600 may then continue from 610 to 612, which comprises delaying resumption of the automatic mode of operation. Thus, the shift to the automatic mode may be delayed for a second duration after the shift to the 4×4 mode has been requested. By waiting a duration to resume the automatic mode after shifting to 4×4, the event that resulted in the shift to 4×4 has sufficient time to be resolved by the additional traction provided by 4×4. The second duration may be an amount of time such as one second. However, in other examples, the second duration may be greater or less than one second. However, in other examples, the second duration may be a number of engine cycles, number of wheel rotations, etc. In yet further examples, the second duration may be adjusted based on vehicle and/or engine operating conditions. For example, the second duration may increase if the vehicle controller detects tilt or yaw that would indicate that the vehicle has lost traction. Thus, the powertrain may wait longer to resume the automatic mode of operation to prevent the vehicle controller from disengaging the second disconnect.

After delaying for the second duration, the one or more disconnects may be shifted to their engaged positions and the powertrain may be switched to the 4×4 mode, and method 600 may continue from 612 to 614 which comprises resuming the automatic mode. Thus, the method 600 at 614 may comprise executing the method 500 described above in FIG. 5.

In this way, if the vehicle is in 4×2 and the controller detects a vehicle slip event, the driveline disconnect will shift into 4×4. This provides increased traction and control during the slip event, thereby eliminating or reducing vehicle slippage. Slippage may be defined as the difference between the left and right wheels or the difference between the front and rear wheels. The level of the difference required to make a shift may be set to a value higher than non-slipping vehicle operation or according to different road conditions. Slippage may also be calculated based on of a number of sensors, including, but not limited to, wheel speed, drive shaft speed, acceleration, yaw, and steering angle.

Figure 7:
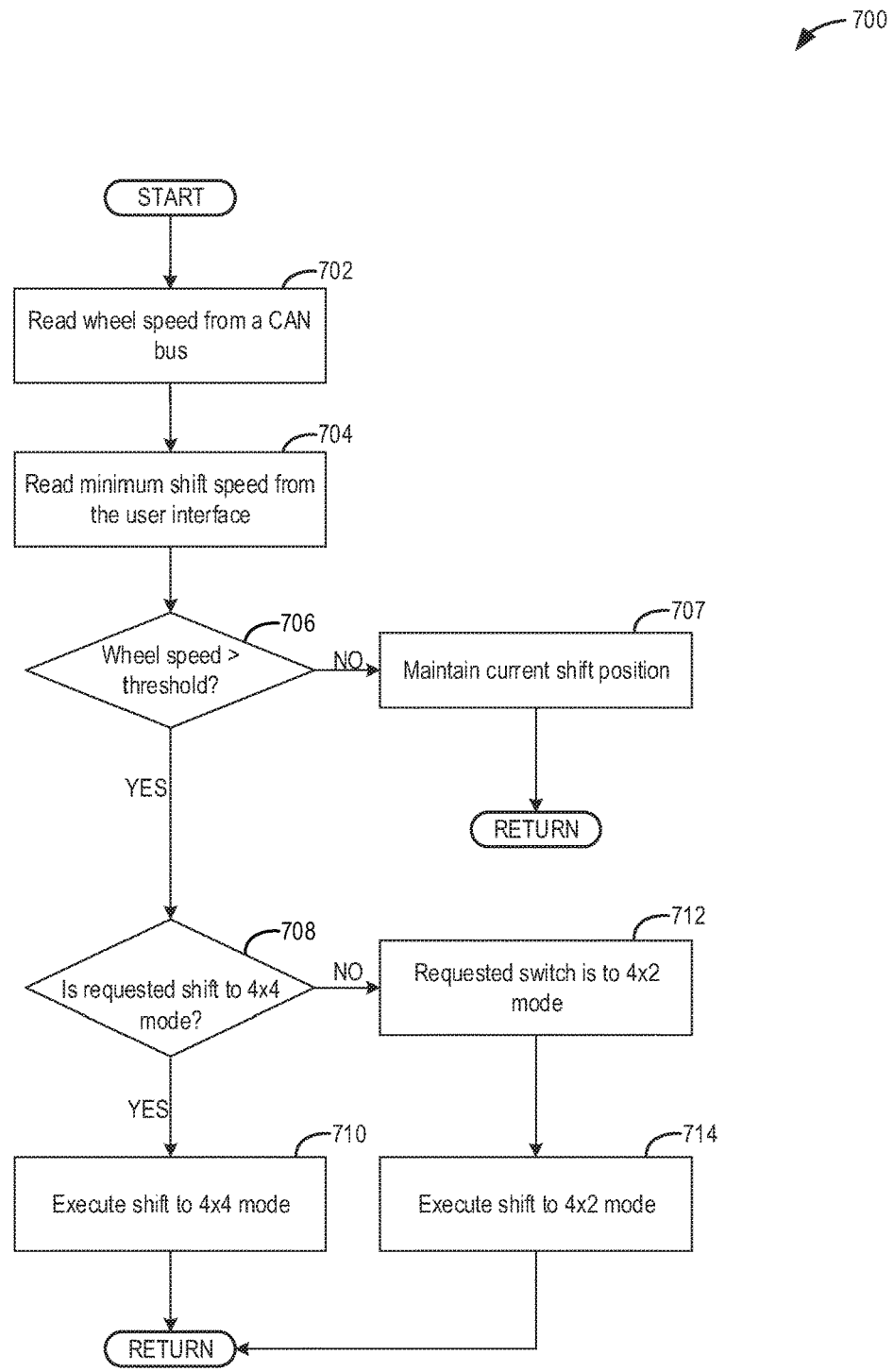
FIG. 7 shows a flow chart of an example method for controlling operation of an electromagnetic disconnect device of a vehicle powertrain, such as the powertrain shown in FIG. 1, in accordance with the present disclosure.

Continuing to FIG. 7, it shows a flow chart of an example method for operating a disconnect device (e.g., second disconnect 160 described above in FIG. 1) of a vehicle powertrain. Thus, method 700 may be executed as a subroutine of method 300 at 308, as described above in FIG. 3.

Method 700 begins at 702 which comprises reading wheel speed from a CAN bus (e.g., CAN bus 206 described above in FIG. 2). Thus, an EMPD shift control module (e.g., EMPD shift control module 212 described above in FIG. 2) may receive signals via the CAN bus relating to the speed of the wheels as estimated from the wheel speed sensors. After reading the wheel speed, method 700 may then continue from 702 to 704 which comprises reading minimum shift speed from the user interface. Then method 700 may continue 704 to 706 which comprises determining if the wheel speed is greater than a threshold shift speed. In other examples, the method at 706 may comprise determining if the rotational speed of an output shaft to which the disconnect is selectively coupled to when adjusted to the engaged position, and decoupled from when adjusted to the disengaged position, is different by more than a threshold from the rotational speed of an input shaft to which the disconnect is permanently coupled to.

If the wheel speed is not greater than the threshold, and/or if the difference in speeds between the input and output shafts is greater than the threshold, method 700 may continue from 706 to 707 which comprises maintaining the current shift position. After maintaining the current shift position, method 700 returns. Thus, the powertrain may wait until the wheels have reached a sufficiently high speed before permitting the disconnect device to shift to the engaged position. This may prevent shifting of the driveline disconnect at wheel speeds and/or output shaft speeds that are too slow for proper functionality. Specifically, by waiting until the wheels speeds and/or output shaft speeds have synchronized with input shaft speeds, gear grinding of the disconnect device (e.g., clutch collar) with the output shaft and/or wheels may be reduced, and a smoother shift to the engaged position and 4×4 mode may be achieved.

If it is determined at 706 that the wheel speed is greater than the threshold and/or if the difference in speed between the input and output shafts is less than the threshold, method 700 may continue from 706 to 708 which comprises determining if the requested shift is to the 4×4 mode. If the requested shift is to the 4×4 mode, then method 700 may continue from 708 to 710 which comprises executing a 4×4 shift. An example of a method for executing a 4×4 shift is described in greater detail below with reference to FIG. 8. Thus, the method 800 described in FIG. 8, may be executed at 710. Method 700 then returns.

However, if it is determined at 708 that the requested shift is not to the 4×4 mode, then method 700 continues from 708 to 712 which comprises determining that the requested shift is to the 4×2 mode. Method 700 then continues from 712 to 714 which comprises executing a shift to the 4×2 mode. An example of a method for executing a shift to the 4×2 mode is described in greater detail below with reference to FIG. 10. Thus, the method 1000 described in FIG. 10, may be executed at 714. Method 700 then returns.

FIG. 8 shows a flow chart of an example method 800 for shifting to a four-wheel drive mode. Method 800 may be executed when a shift to the AWD mode is desired. Thus, method 800 may be executed as a subroutine of method 700 at 710, as described above in FIG. 7. Method 800 begins at 802 which comprises determining if feedback is 4×4. Thus the method 800 at 802 may comprise determining if the 4×4 mode is already engaged. This may comprise determining if the second disconnect (e.g., second disconnect 160 described above in FIG. 1) and/or transfer case disconnect (e.g., first disconnect 150 described above in FIG. 1) are already in their engaged positions. In particular, the controller may receive a feedback signal from the second disconnect and/or transfer case disconnect indicating an operating state and/or current position of one or both of the disconnects. For example, the second disconnect may send an electrical signal encoding the current position of the disconnect to the controller. The controller may decode the signal to determine the position of the disconnect. The disconnect may be in the engaged (4×4) or disengaged (4×2) position, or a position there-between. If the disconnects are already in their engaged positions, and the vehicle is in the 4×4 mode, method 800 may continue from 802 to 803 which comprises maintaining the 4×4 mode as described in greater detail below with reference to FIG. 13. Method 800 then returns.

However, if the disconnects are not in their engaged positions, and the vehicle is in the 4×2 mode, then method 800 may continue from 802 to 804 which comprises increasing the voltage and/or current supplied to an actuator of the transfer case disconnect over a first duration to synchronize shaft speeds. For example, the shaft speeds may be the speeds of a first propeller shaft (e.g., front drive shaft 133 described above in FIG. 1) and a rear propeller shaft (e.g., rear drive shaft 131 described above in FIG. 1). Increasing the voltage and/or current supplied to the coil, motor, or other actuator of the transfer case disconnect may shift the disconnect towards the engaged position. More specifically, by increasing the voltage and/or current supplied to the actuator of the transfer case, the actuator may move a clutch collar of the transfer case towards an engaged position where the clutch collar couples the two shafts. Thus, an amount of torque transmitted between the two shafts may increase. Specifically, an amount of torque transmitted from a transmission (e.g., transmission 115 described above in FIG. 1) to an output shaft selectively coupled to the transfer case (e.g., transfer case 140 described above in FIG. 1) may increase as the current and/or voltage is increased at 804. Thus, the method at 804 may comprise increasing an amount of torque transmitted to an output shaft selectively coupled to the transfer case, (also referred to herein as secondary driveline component) where in the engaged position of the transfer case disconnect the secondary driveline component is coupled to the transfer case, and in the disengaged position of the transfer case disconnect, the secondary driveline component is decoupled from the transfer case. In the example shown in FIG. 8, the torque transmitted to the secondary driveline component or output shaft may be increased by increasing an amount of electrical power provided to the transfer case actuator and shifting the transfer case disconnect towards the engaged position.

After increasing torque transmission to the secondary driveline component at 804, method 800 may continue to 806 which comprises decreasing the voltage and/or current supplied to the actuator of the transfer case disconnect to reduce torque transmitted to the shaft selectively coupled to the transfer case. FIGS. 9, and 12 provide a greater description of how the torque transmitted to the shaft selectively coupled to the transfer case disconnect may be varied during a shift to the 4×4 mode.

Method 800 may then continue from 806 to 808 which comprises commanding the second disconnect or EMPD to an engaged position to make the shift to the 4×4 mode. The second disconnect may be shifted to the engaged position in the same or similar manner to that described above at 804, where current and/or voltage supplied to the actuator of the second disconnect may be increased. Thus, both the first disconnect and second disconnect may be shifted to engaged positions to shift to the 4×4 mode. Method 800 may then proceed to 810 which comprises determining if the feedback is 4×4 in the same or similar manner to that described above at 802. In particular, the controller may receive a feedback signal from the second disconnect and/or transfer case disconnect indicating an operating state and/or current position of one or both of the disconnects. For example, the second disconnect may send an electrical signal encoding the current position of the disconnect to the controller. The controller may decode the signal to determine the position of the disconnect. The disconnect may be in the engaged (4×4) or disengaged (4×2) position, or a position there-between. If the vehicle has successfully shifted to the 4×4 mode, then method 800 may continue to 803 and maintain the 4×4 mode. Method 800 then returns. However, if the shift to 4×4 has not occurred, then method 800 may continue from 810 to 812 which comprises determining if an error feedback is high In particular, the controller may receive a signal from the second disconnect and/or transfer case disconnect indicating error information. If the error feedback is high, a shift error may be generated at 814. Thus, the method may continue from 812 to 814 if the shift error is high. The shift error may then be communicated to a vehicle operator via an alert or notification presented to the user via the user interface. Method 800 then returns.

However, if the error feedback is not high at 812, then method 800 may continue from 812 to 816 which comprises determining if a duration has elapsed since the commanded shift to the 4×4 mode. The duration may be an amount of time such as 25 ms. However, in other examples, the duration may be a number of engine cycles, number of wheel rotations, etc. In yet further examples, the duration may be adjusted based on vehicle and/or engine operating conditions. If the duration has expired, and the shift to 4×4 has still not occurred, then method 800 may continue from 816 to 814 and generate a shift error. Method 800 then returns. However, if the duration has not elapsed, then method 800 may return from 816 to 810.

FIG. 9 shows a graph 900 depicting adjustments to an amount of voltage supplied to an actuator (e.g., electromagnetic coil or motor) of the transfer case disconnect during a shift to a 4×4 mode. By adjusting the amount of voltage and/or current supplied to the actuator of the transfer case disconnect, an amount of torque provided to a secondary driveline component (e.g., shaft 133 shown in FIG. 1 when the vehicle is configured as a rear-wheel drive vehicle in 2 WD mode) that is selectively coupled to a transfer case, when a shift from to a four-wheel drive mode is commanded may be adjusted. As such, the voltage and/or current supplied to the actuator of the transfer case disconnect may be proportional to, related to, or similar or the same to the amount of torque transmitted to the secondary driveline component. Thus, the secondary driveline component may only receive torque from the transmission and transfer case in a 4×4 mode, or when a shift to the 4×4 is commanded by a vehicle operator or vehicle controller. Thus, FIG. 9 depicts example torque transmission adjustments to a secondary driveline component selectively coupled to the transfer case when shifting to a 4×4 mode. As such, FIG. 9 depicts the torque transmission adjustments that may be performed at 804 and 806 of method 800 described above in FIG. 8.

Graph 900 plots the voltage supplied to the actuator of the transfer case along a vertical axis, and time along a horizontal axis. Before time $t_1$, the voltage supplied to the actuator may be at a lower first level $T_1$. The lower first level $T_1$ may be approximately zero. Thus, substantially no torque may be transmitted to the secondary driveline component before $t_1$. As such the vehicle may be in the 4×2 mode before $t_1$. However, in other examples $T_1$ may be greater than zero.

At $t_1$ a shift to 4×4 may be commanded and the voltage supplied to the actuator may be increased. As such, in some examples, the transfer case output torque may be increased. The voltage may be ramped up from the lower first level $T_1$ to a higher second level $T_2$ over a duration, between $t_1$ and $t_2$. The duration and/or rate of ramping may be adjusted depending on vehicle operating conditions. Further, the voltage may be increased in a non-linear manner as described in greater detail below with reference to FIG. 12.

Upon reaching the higher second level $T_2$ at $t_2$, the transfer case coil voltage may be decreased to a lower third level. The lower third level may be the same or greater than the lower first level $T_1$. After $t_2$ the secondary driveline component may be coupled to the transfer case, and as such power from the engine (e.g., engine 110 described above in FIG. 1) may be transmitted towards all four wheels of the vehicle. Thus, the vehicle may be in the 4×4 mode after $t_2$. After $t_2$, while in the 4×4 mode, the amount of voltage supplied to the transfer case actuator and in some examples, the torque transmitted to the secondary driveline component may be adjusted based on vehicle operating parameters such as: throttle position, left-to-right wheel slippage, front-to-rear wheel slippage, outside air temperature, steering angle, vehicle yaw, etc.

Turning now to FIG. 10, it shows a flow chart of an example method for shifting to a two-wheel drive mode. Method 1000 may be executed when a shift to the 2 WD mode is desired. Thus, method 1000 may be executed as a subroutine of method 700 at 714, as described above in FIG. 7. Method 1000 begins at 1002 which comprises determining if feedback is 4×2. Thus the method 1000 at 1002 may comprise determining if the 4×2 mode is already engaged. In particular, the controller may receive a feedback signal from the second disconnect and/or transfer case disconnect indicating an operating state and/or current position of one or both of the disconnects. For example, the second disconnect may send an electrical signal encoding the current position of the disconnect to the controller. The controller may decode the signal to determine the position of the disconnect. The disconnect may be in the engaged (4×4) or disengaged (4×2) position, or a position there-between. This may comprise determining if the second disconnect (e.g., second disconnect 160 described above in FIG. 1) and/or transfer case disconnect (e.g., first disconnect 150 described above in FIG. 1) are already in their disengaged positions. If, the disconnects are already in their disengaged positions, and the vehicle is in the 4×2 mode, method 1000 may continue from 1002 to 1003 which comprises maintaining the 4×2 mode. Method 1000 then returns.

However, if the disconnects are not in their disengaged positions, and the vehicle is in the 4×4 mode, then method 1000 may continue from 1002 to 1004 which comprises decreasing the voltage and/or current supplied to an actuator of the transfer case disconnect to reduce torque on a secondary driveline component to be uncoupled (e.g., propeller shaft) to initiate a shift to the 4×2 mode. Thus, by adjusting the voltage supplied to the transfer case disconnect, the amount of torque supplied to the secondary driveline may be adjusted. In particular, increasing the voltage supplied to the transfer case actuator (e.g., coil) adjusts the transfer case disconnect towards the engaged position and away from the disengaged position, and vice versa. Thus, the amount of torque transferred to the secondary driveline by the transfer case may increase as the voltage supplied to the transfer case disconnect (e.g., coil) is increased, and vice versa. In one example, the torque may be reduced over a first duration to decouple the secondary driveline component from the transfer case. Decreasing the voltage and/or current supplied to the coil, motor, or other actuator of the transfer case disconnect may shift the disconnect to the disengaged position. Thus, an amount of torque transmitted to the secondary driveline component may decrease. In some examples, the transfer case coil voltage, and thus transfer case torque transmitted to the secondary driveline, may be decreased to a lower first level.

After decreasing torque transmission to the secondary driveline components, method 1000 may continue to 1006 which comprises commanding the second disconnect or EMPD to shift to a disengaged position to make the shift to the 4×2 mode. However, in some examples, the clutch ring of the second disconnect may fail to shift to the disengaged position, even when the actuator of the second disconnect has shifted to the disengaged position.

Thus, method 1000 may continue from 1006 to 1008 which comprises increasing the voltage and/or current supplied to the actuator of the transfer case disconnect to increase an amount of torque transmitted to the input shaft of the second disconnect or EMPD, to push on the shift collar of the second disconnect and clear a torque lock event. Thus, in the event of a torque lock event, where the clutch collar of the second disconnect remains in the engaged position, providing torque to the secondary driveline component may push on the shift collar, and release it to a disengaged position where the input and outputs shafts are decoupled from one another. FIGS. 9, and 12 provide a greater description of how the torque transmitted to the shaft selectively coupled to the transfer case disconnect may be varied during a shift to the 4×4 mode. In some examples, the transfer case torque output to the secondary driveline, and therefore transfer case coil voltage may be increased from the lower first level to a higher second level. However, in other examples, if the shift collar releases to the disengaged position before the torque reaches the higher second level, then the transfer case torque output to the secondary driveline and/or transfer case coil voltage may be reduced to approximately zero.

Method 1000 may then continue from 1008 to 1010 which comprises decreasing the voltage and/or current provided to the actuator of the transfer case disconnect to reduce torque transmitted to the secondary driveline component, and switch to the 4×2 mode. Method 1000 may then proceed to 1012 which comprises determining if the feedback is 4×2 in the same or similar manner to that described above at 1002. If the vehicle has successfully shifted to the 4×2 mode, then method 1000 may return from 1012. However, if the shift to 4×2 has not occurred, then method 1000 may continue from 1012 to 1014 which comprises determining if an error feedback is high. If the error feedback is high, a shift error may be generated at 1016. Thus, the method may continue from 1014 to 1016 if the shift error is high. The shift error may then be communicated to a vehicle operator via an alert or notification presented to the user via the user interface. Method 1000 then returns.

However, if the error feedback is not high at 1014, then method 1000 may continue from 1014 to 1018 which comprises determining if a duration has elapsed since the commanded shift to the 4×2 mode. The duration may be an amount of time such as 25 ms. However, in other examples, the duration may be a number of engine cycles, number of wheel rotations, etc. In yet further examples, the duration may be adjusted based on vehicle and/or engine operating conditions. If the duration has expired, and the shift to 4×2 has still not occurred, then method 1000 may continue from 1018 to 1016 and generate a shift error. Method 1000 then returns. However, if the duration has not elapsed, then method 1000 may return from 1018 to 1008.

Moving on to FIG. 11, it shows a graph 1100 depicting adjustments to an amount of voltage supplied to an actuator (e.g., electromagnetic coil or motor) of the transfer case disconnect during a shift to a 4×2 mode at plot 1102. Thus, FIG. 11 depicts example torque transmission adjustments to the secondary driveline component when shifting to a 4×2 mode. As such, FIG. 11 depicts the torque transmission adjustments that may be performed at 1004 and 1008 of method 1000 described above in FIG. 10.

Graph 1100 plots the voltage supplied to the actuator of the transfer case along a vertical axis, and time along a horizontal axis. Before time $t_1$, vehicle may be in a 4×4 mode. Thus, the amount of voltage supplied to the transfer case actuator and in some examples, the torque transmitted to the secondary driveline component may be adjusted based on vehicle operating parameters such as: throttle position, left-to-right wheel slippage, front-to-rear wheel slippage, outside air temperature, steering angle, vehicle yaw, etc., in the same or similar manner described above after $t_2$ in the graph 900 shown in FIG. 9.

At $t_1$ a shift to 4×2 may be commanded and the voltage supplied to the actuator may be decreased. In the example shown in FIG. 11, the voltage may be stepped down to a lower first level $T_1$ at $t_1$. However, in other examples, the voltage may be reduced in a more gradual linear or non-linear manner. The rate, amount, and/or shape of the decrease in voltage may be adjusted based on vehicle operating conditions. As such, in some examples, the transfer case output torque may be decreased at $t_1$.

In some examples, the voltage may be held at the lower first level $T_1$ for a duration, and then the voltage may be increased. However, in other examples, the voltage may be increased from the lower first level $T_1$ after the voltage reaches the lower first level $T_1$. In yet, further examples, the voltage may only be increased if it is determined that the second disconnect has not shifted to the disengaged position. Thus, in some examples, if the second disconnect has shifted to the disengaged position after decreasing the voltage to the lower first level $T_1$, then the voltage may not be increased, and may set to zero to maintain the 4×2 mode.

Between $t_1$ and $t_2$, the voltage supplied to the actuator of the transfer case may be increased from the lower first level $T_1$ to a higher second level $T_2$. Upon reaching the higher second level $T_2$, the voltage may be stepped down to a lower third level. The lower third level may be approximately the same as the lower first level $T_1$. In some examples, one or more of the lower first level $T_1$, and lower third level may be approximately zero, and thus the coil may not be energized. The coil voltage may be increased between $t_1$ and $t_2$ to release a clutch collar of a second disconnect (e.g., disconnect 160 described above in FIG. 2) from a torque lock condition.

However, in other examples, the transfer case voltage may be increased from the lower first level until the second disconnect disengages. Thus, the transfer case voltage may be reduced to the lower third level before the transfer case voltage reaches the higher second level, if the clutch collar of the second disconnect transitions to the disengaged position before the transfer case voltage reaches the higher second level. In yet further examples, the transfer case voltage may be continue to increase above the higher second level if the second disconnect remains engaged when the transfer case voltage reaches the higher second level. In yet further examples, the transfer case voltage may be maintained at the higher second level until the second disconnect disengages if the second disconnect remains in the engaged position when the transfer case voltage reaches the higher second level at $t_2$. In yet further examples, the transfer case voltage may be repeatedly increased up to the higher second level, and then reduced to either the lower first or lower third levels until the second disconnect disengages. Thus, if the second disconnect remains in the engaged position after $t_2$, the transfer case voltage may be modulated back and forth between the higher second level and either the lower first or lower third levels, repeatedly, until the second disconnect shifts to the disengaged position. In still further examples, the transfer case voltage may not be increased between $t_1$ and $t_2$ if the second disconnect disengages when the transfer case voltage is decreased to the lower first level. Thus, the transfer case voltage may only be increased to the higher second level if the second disconnect remains in the engaged position after the transfer case voltage is reduced to the lower first level. The first and third transfer case voltage levels may comprise approximately the same voltage in some examples. For examples, the first and third levels voltage levels may comprise approximately zero, where the transfer case coil is not energized.

Upon reaching the lower third level at $t_2$, the secondary driveline component may be decoupled from the transfer case, and as such power from the engine (e.g., engine 110 described above in FIG. 1) may not be transmitted towards all four wheels of the vehicle. Thus, the vehicle may be in the 4×2 mode after $t_2$.

Continuing to FIG. 12, it shows a graph 1200 of example adjustments to a transfer case torque during varying vehicle operating conditions where the vehicle is shifting between 2 WD and AWD modes. Graph 1200 shows a first plot 1202, depicting changes in a transfer case torque. The transfer case torque may be an amount of torque transmitted to a secondary driveline component that does not receive torque from the engine (e.g., engine 110 described above in FIG. 1) when the transfer case transfer case disconnect (e.g., transfer case disconnect 150 described above in FIG. 1) is in the disengaged position. Specifically, as described above, the transfer case torque may be increased by increasing an amount of electrical power (e.g., voltage and/or current) supplied to an actuator of the transfer case disconnect and shifting a clutch collar of the disconnect towards an engaged position where torque is from the engine is transferred to the secondary driveline component. Further, in some examples, decreasing the amount of electrical power supplied to the actuator of the transfer case disconnect may shift the clutch collar of the disconnect towards a disengaged position where input and output shafts are decoupled from one another. Thus the transfer case torque may represent and/or be proportional to the electrical power supplied to the actuator of the transfer case disconnect, at least in some examples. Thus, the transfer case torque may refer to one or more of the following: an amount of current and/or voltage supplied to an actuator of the transfer case disconnect, an amount of torque transmitted to the secondary driveline component, and a position of a clutch collar of the transfer case disconnect. Increases in transfer case torque may indicate a positioning of the clutch collar more proximate the engaged position and more distal the disengaged position, and vice versa. As such, increasing the transfer case torque may refer to increasing the voltage and/or current supplied to the actuator of the transfer case disconnect. Further, decreasing the transfer case torque may refer to decreasing the voltage and/or current supplied to the actuator of the transfer case disconnect.

Further, graph 1200 shows a second plot 1204 depicting changes in a shift position of a secondary disconnect device (e.g., second disconnect 160 described above in FIG. 1) that may be coupled between the transfer case disconnect and one or more wheels of the vehicle. The disconnect device may shift between an engaged position (E) where input and output shafts that are selectively coupled to one another via the secondary disconnect device are coupled to one another and a disengaged position (D) where the input and output shafts are decoupled from one another.

Before time $t_1$, the vehicle may be in a 4×4 mode, and the disconnect device may be in an engaged position. Thus, the transfer case torque may be adjusted based on vehicle operating parameters such as: throttle position, left-to-right wheel slippage, front-to-rear wheel slippage, outside air temperature, steering angle, vehicle yaw, etc., in the same or similar manner described above after $t_2$ in the graph 900 shown in FIG. 9.

At $t_1$ a shift to 4×2 may be commanded and the voltage supplied to the actuator may be decreased. As described above with reference to FIG. 4, the shift may be commanded by a vehicle operator (e.g., operator 170 described above in FIG. 1) in a manual mode. Alternatively in an automatic mode, the shift may be commanded by a vehicle controller (e.g., controller 12 described above in FIG. 1) as described above with reference to FIGS. 5 and 6.

The controller may also take into account a variety data to make driveline disconnect shifting decisions. For example, the controller may determine when to shift between 4×2 and 4×4 modes based on vehicle operating conditions such as one or more of: outside air temperature, steering angle, vehicle yaw, windshield wiper state, driver selectable mode controls such as sport, economy, winter, etc., brake pressure, anti-lock brake control status, altitude, tire pressure, fog light state, driver and occupant presence, driving habits, weather forecast, navigation routing road conditions, terrain, and traffic conditions.

In the example shown in FIG. 12, the transfer case torque may be stepped down to a lower first level $T_1$ at $t_1$. As such, in some examples, the voltage and/or current supplied to the actuator of the transfer case disconnect may be set to zero. However, in other examples, such as shown between $t_9$ and $t_{10}$, the transfer case torque may be gradually reduced to $T_1$ when switching to the 4×2 mode. In some examples, the transfer case torque level at $T_1$ may be approximately zero. Thus substantially no torque may be transmitted to the secondary driveline component. Further, the secondary disconnect device may shift to the disengaged position at $t_1$ in response to commanded shift to the 4×2 mode. As such, between $t_1$ and $t_2$, the secondary disconnect device and transfer case disconnect may be in their respective disengaged positions. At $t_2$, a shift to the 4×4 mode is commanded, and the transfer case torque is stepped up to a higher second level $T_2$. However, in other examples, as shown between $t_6$ and $t_7$ the transfer case torque may be gradually increased when switching to the 4×4 mode. At $t_2$ the disconnect device is also shifted to its engaged position to complete the shift to the 4×4 mode.

Between $t_2$ and $t_3$, the transfer case disconnect is engaged and the amount of torque transferred to the secondary driveline component is adjusted based on vehicle operating conditions in the same or similar manner to that described above before $t_1$. For example, the transfer case torque may be set according to the following function:

Torque=$K1$+$K2$×(throttle position)+$K3$×(left/right slip)+$K4$×(front/rear slip)

Where: K1 represents a fixed off-set to establish the minimum transfer case torque level, and where K2 represents a transfer case torque level as a function of throttle position, and where K3 represents transfer case torque level as a function of left-to-right wheel slippage, and where K4 represents transfer case torque level as a function of front-to-rear wheel slippage.

At $t_3$, a shift back to 4×2 may be commanded, and the transfer case torque may be reduced to a lower third level $T_3$. In some examples, the lower third level $T_3$ may be approximately the same as lower first level $T_1$. However, in other examples, the lower third level $T_3$ may be greater or less than lower first level $T_1$.

In some example, the transfer case torque may be held at the lower third level $T_3$ for a duration, between $t_3$ and $t_4$. However, between $t_3$ and $t_4$, the secondary disconnect may be commanded to shift to the disengaged position, but remain in the engaged position due to a torque lock condition. Thus, the clutch collar of the secondary disconnect may fail to move to the disengaged position. Thus, between $t_4$ and $t_5$, the transfer case torque may be ramped up at a higher first ramp rate from the lower third level $T_3$ to a higher level such as higher second level $T_2$. Upon reaching the higher level at $t_5$, the transfer case torque may then be stepped down to the lower first level $T_1$. At $t_5$, the secondary disconnect may shift to the disengaged position. For example, the clutch collar of the secondary disconnect may release from the torque lock condition due to the increased torque provided from the transfer case between $t_4$ and $t_5$, and may shift to the disengaged position. Thus, if the secondary disconnect does not shift to the disengaged position when the transfer case torque is initially decreased at $t_3$, the transfer case torque may be ramped up between $t_4$ and $t_5$ to push the clutch ring of the secondary disconnect and encourage release of the clutch ring to the disengaged position. However, in other examples, such as before between $t_1$ and $t_2$, when the secondary disconnect disengages during the first initial drop in transfer case torque, the transfer case torque may not be ramped up to release the shift collar.

Between, $t_5$ and $t_6$, transfer case torque may remain at the lower first level $T_1$, and the vehicle may remain in a 4×2 mode. At $t_6$ a shift to the 4×4 mode may be commanded. The transfer case torque may be ramped up to the higher second level $T_1$ from the lower first level $T_1$ between $t_6$ and $t_7$ to shift to the 4×4 mode. The secondary disconnect may engage sometime between $t_6$ and $t_7$. However, in other examples, the torque may only be increased until the disconnect device engages, and then once the disconnect device is engaged, the transfer case torque may be adjusted based on vehicle operating conditions.

Between $t_7$ and $t_8$, the transfer case torque may be adjusted based on vehicle operating conditions in the same or similar manner to that described above before $t_1$. Then at $t_8$, a shift to the 4×2 mode may be commanded, and the transfer case torque may be stepped down to the lower third level $T_3$. As shown in the example at $t_8$, the transfer case torque may in some examples, be ramped up immediately in response to the transfer case torque reaching the lower third level $T_3$ if the secondary disconnect remains in the engaged position. The transfer case torque may be increased at a lower second rate between $t_8$ and $t_9$, and the secondary disconnect may disengage between $t_8$ and $t_9$ due to the increased torque provided from the transfer case. Between $t_9$ and $t_{10}$, the transfer case torque may be reduced to the lower first level $T_1$ in a non-linear manner. The rate, shape, and geometry of the decrease may be adjusted as desired. Between $t_{10}$ and $t_{11}$, the secondary disconnect may remain disengaged, transfer case torque remains at $T_1$, and the vehicle may remain in 4×2 mode. Then at $t_{11}$, a shift to 4×4 may be commanded and the transfer case torque may be increased in a non-linear manner between $t_{11}$ and $t_{12}$. At $t_{12}$ the secondary disconnect may become engaged. The transfer case torque may begin to be adjusted according to vehicle operating conditions in the same or similar manner to that before $t_1$. At $t_{13}$ a shift to the 4×2 mode may be commanded. The transfer case torque may be ramped down to the lower third level $T_3$. However, the secondary disconnect may remain engaged between $t_{13}$ and $t_{15}$, and as such, at $t_{is}$, the transfer case torque may be increased from the lower first level $T_3$ to try and release the clutch collar of the secondary disconnect. The transfer case torque may be increased in a non-linear manner between $t_{15}$ and $t_{16}$. The clutch collar and secondary disconnect may become disengaged at $t_{16}$. In response to the secondary disconnect becoming disengaged at $t_{16}$, the transfer case torque may stop increasing, and may begin being reduced towards the lower first level $T_1$. The transfer case torque may be reduced to the lower first level $T_1$ between $t_{16}$ and $t_{17}$. After $t_{17}$, the vehicle may remain in the 4×2 mode. Thus, when shifting to a 4×2 mode, the transfer case torque provided to the secondary disconnect may initially be decreased to the lower third level $T_3$. If the secondary disconnect disengages, then the transfer case torque may be reduced and/or maintained at approximately zero. However, if the secondary disconnect does not disengage after decreasing the transfer case torque to the lower third level $T_3$, then the transfer case torque may be increased. The transfer case torque may be increased until the secondary disconnect shifts to the disengaged position, and then may be reduced to the lower first level $T_1$. However, in other examples, the transfer case torque may be increased to a pre-set threshold and may then be reduced to the lower first level $T_1$. If the secondary disconnect still remains engaged, a shift error may be alert may be sent to the vehicle operator.

Thus, the transfer case torque may be initially decrease when a shift from a 4×4 to a 4×2 mode is commanded. In some examples, if the disconnect device positioned between the transfer case torque disconnect and one or more wheels does not disengage in response to the initial decrease in transfer case torque, then the transfer case torque may be increased until the disconnect device disengages. In other examples, the transfer case torque may be increased to a pre-set level. In other examples, the transfer case torque may be increased regardless of whether or not the disconnect device disengages after the initial decrease in transfer case torque. After the transfer case torque reaches the pre-set threshold, or the disconnect disengages, the transfer case torque may then be reduced to zero to disengage the secondary driveline component.

If the vehicle is in 4×2 and the CM detects a vehicle slip event, the driveline disconnect will shift into 4×4. This provides increased traction and control during the slip event, thereby eliminating or reducing vehicle slippage. Slippage may be defined as the difference between the left and right wheels or the difference between the front and rear wheels. The level of the difference required to make a shift may be set to a value higher than non-slipping vehicle operation or according to different road conditions. Slippage may also be calculated based on of a number of sensors, including, but not limited to, wheel speed, drive shaft speed, acceleration, yaw, and steering angle.

In this way, when a 4×4 shift is commanded, the transfer case torque is first ramped up to a certain level to accelerate the driveline shafting. It is then dropped to a lower level to minimize torque during shifting of the driveline disconnect. After a brief delay, the driveline disconnect will then shift to 4×4. This scheme assures that the various elements of the driveline are rotating at nearly the same speed so that the driveline disconnect clutch collar teeth with engage smoothly and without ratcheting.

Further, when a 4×2 shift is commended, the transfer case torque is first dropped to a low level to eliminate torque on the driveline disconnect clutch collar. The driveline disconnect then shifts to 4×2. After the shift is complete, the transfer case torque is briefly ramped up to a level and then dropped to a low level. This scheme assures that the driveline disconnect clutch collar teeth slide freely and are not pinched due to residual torque and prevented from sliding and shifting to 4×2. The brief ramp-up of the transfer case torque releases the driveline disconnect clutch collar free of any residual torque, thereby shifting freely and without delay.

Figure 13:
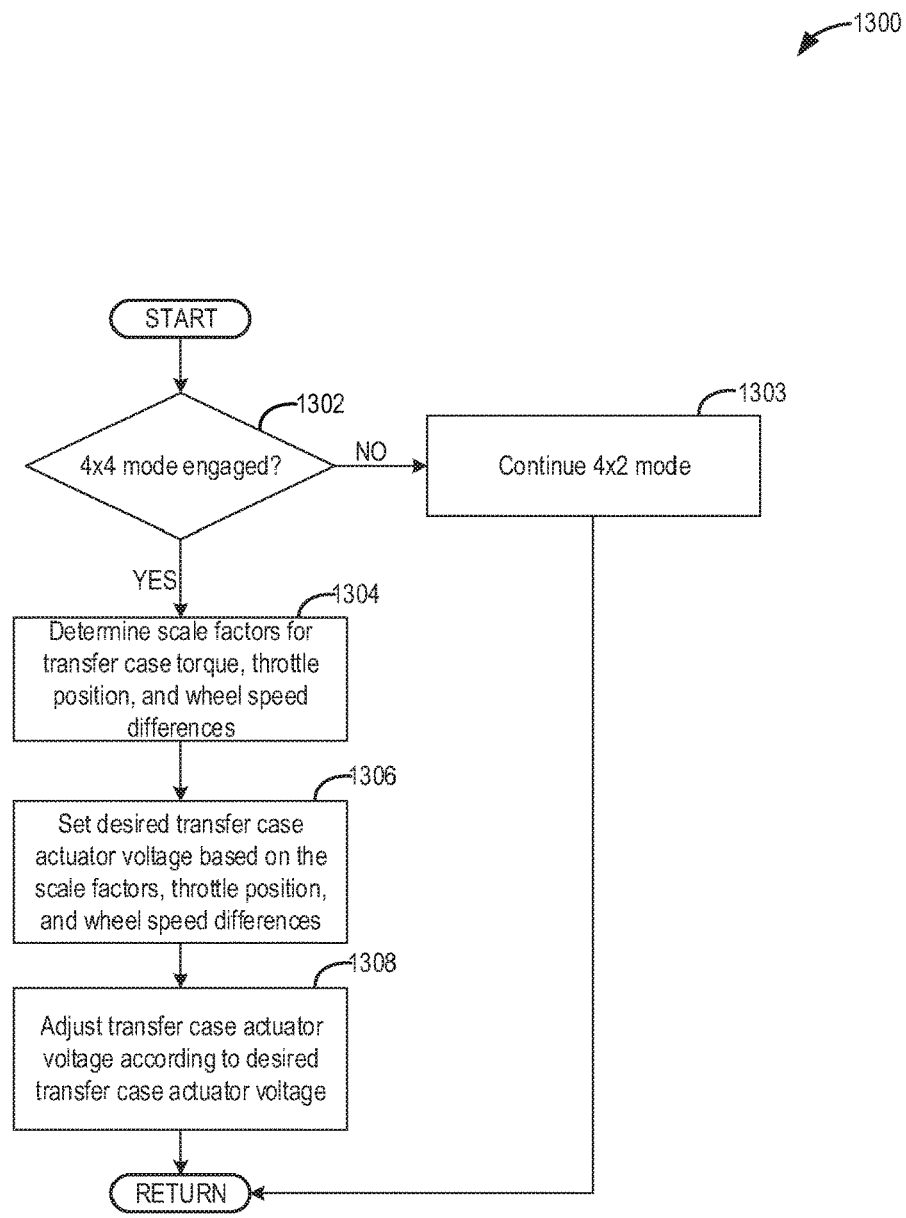
FIG. 13 shows a flow chart of an example method for controlling operation of a transfer case of a vehicle powertrain, such as the powertrain shown in FIG. 1, in accordance with the present disclosure.

Continuing to FIG. 13, it shows a flow chart of an example method 1300 for adjusting operation of a transfer case during a four-wheel drive mode. Method 1300 begins at 1302 which comprises determining if the vehicle is in a 4×4 mode. If the vehicle is not in a 4×4 mode, the method 1300 continues to 1303 which comprises continuing in the 4×2 mode. Method 1300 then returns. However, if the vehicle is in a 4×4 mode, the method 1300 continues to 1304 which comprises reading scale factors K1, K2, K3, and K4, described above with reference to FIG. 12, throttle position, and difference in wheel speeds. Method 1300 then continue to 1306 which comprises setting a pulse width modulated (PWM) signal to a coil of the transfer case disconnect based on the scale factors, throttle position, and wheel speed, and the transfer equation given above in FIG. 12:

$$\text{Torque} = K1 + K2 \times (\text{throttle position}) + K3 \times (\text{left/right slip}) + K4 \times (\text{front/rear slip})$$

Where: K1 represents a fixed off-set to establish the minimum transfer case torque level, and where K2 represents a transfer case torque level as a function of throttle position, and where K3 represents transfer case torque level as a function of left-to-right wheel slippage, and where K4 represents transfer case torque level as a function of front-to-rear wheel slippage. After determining the desired transfer case actuator voltage at 1306, method 1300 continues to 1308 which comprises adjusting the transfer case actuator voltage according to the desired transfer case actuator voltage determined at 1306. Thus, the controller may adjust a command signal, such as a pulse-width modulated signal, sent to the transfer case actuator to deliver the desired transfer case actuator voltage. Method 1300 then returns.

Figure 14:
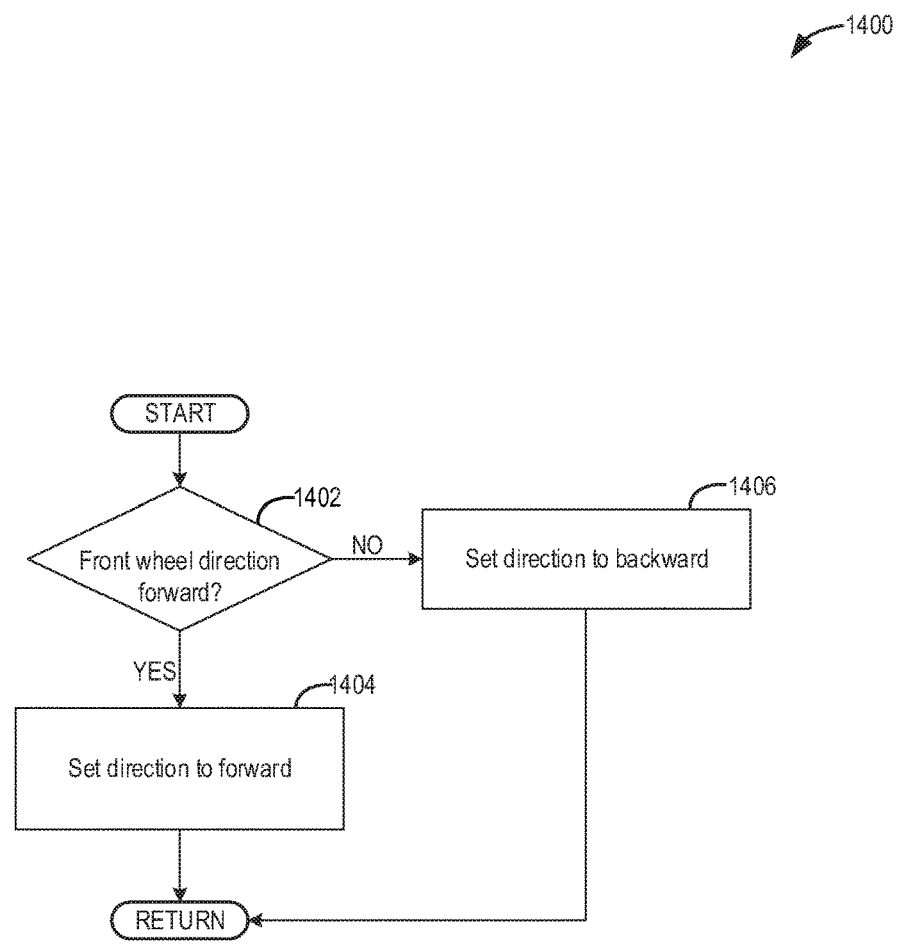
FIG. 14 shows a flow chart of an example method for determining a directional drive mode of a vehicle powertrain, such as the powertrain shown in FIG. 1, in accordance with the present disclosure.

Turning to FIG. 14, it shows a flow chart of an example method 1400 for determining if a powertrain is in forward or reverse. Specifically method 1400 may be used, if the driveline disconnect (e.g., disconnect 160 described above in FIG. 1) is a type with a motor used to power the shifting mechanism, the direction of the motor may be set to match the forward or reverse direction of the driveline. This assures that the driveline assists the motor in moving the shifting mechanism and does not hinder it.

Method 1400 begins at 1402 which comprises determining if the front wheel direction is forward. If the front wheel direction is forward, the method 1400 continues from 1402 to 1404 which comprises setting the direction to forward. Method 1400 then returns. However if at 1402 it is determined that the front wheel direction is not forward, then method 1400 may continue from 1402 to 1406 which comprises setting the direction to backward. Method 1400 then returns.

Figure 15:
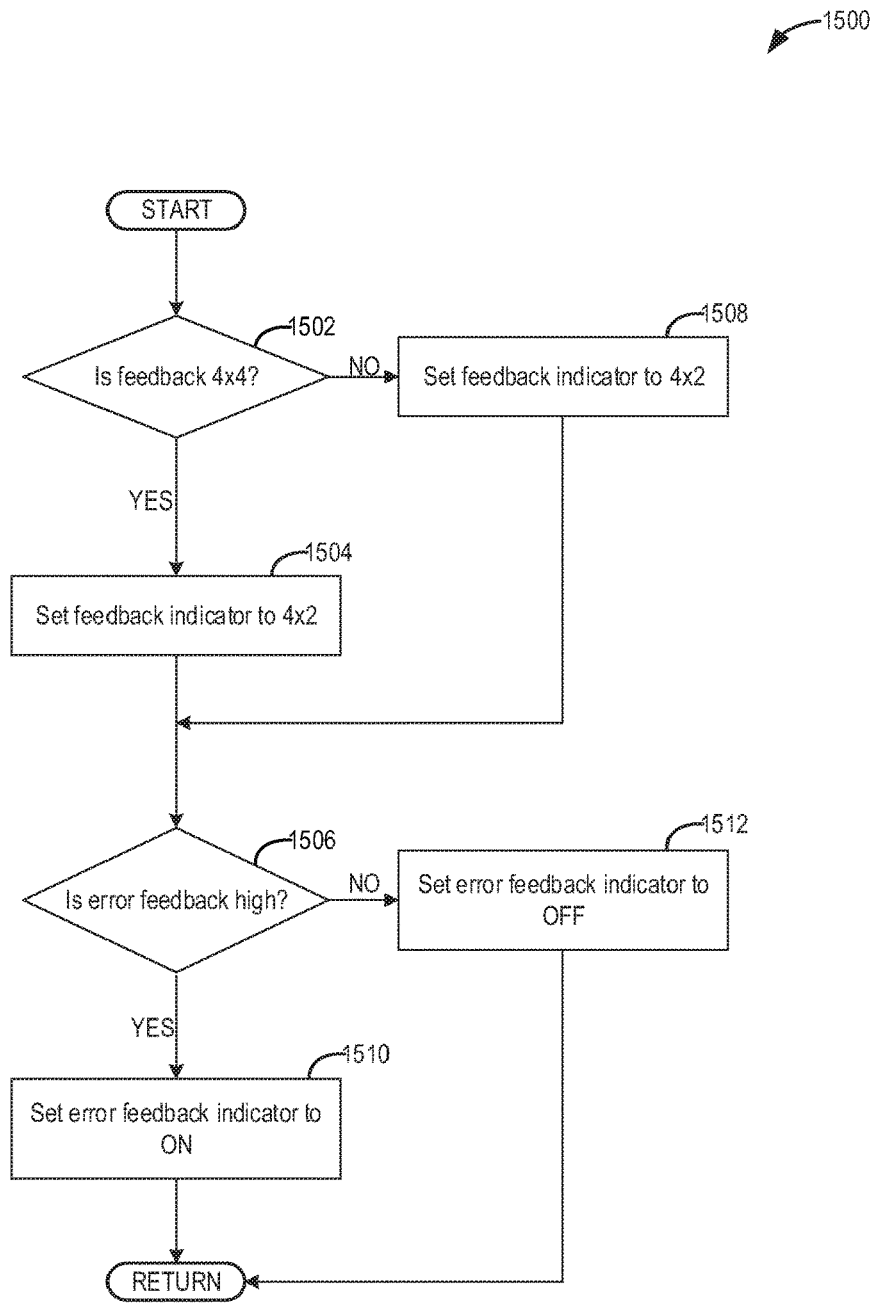
FIG. 15 shows a flow chart of an example method for identifying a shift error when shifting between two-wheel drive and four-wheel drive modes in a vehicle powertrain, such as the powertrain shown in FIG. 1, in accordance with the present disclosure.

FIG. 15, shows a flow chart of an example method 1500 for providing feedback on the current position of the one or more disconnects (e.g., second disconnect 160 described above in FIG. 1) when shifting between the two-wheel drive and four-wheel drive modes. Method 1500 may be executed at feedback loop 218 of FIG. 2. Method 1500 begins at 1502 which comprises determining if feedback is 4×4 in the same or similar manner to that described above in 802 of method 800 described above in FIG. 8. If feedback is 4×4, method 1500 continues from 1502 to 1504 which comprises setting a feedback indicator to 4×4. Method 1500 then continues from 1504 to 1506 which comprises determining if the error feedback is high. Alternatively, if at 1502 the feedback is not 4×4 method 1500 may proceed from 1502 to 1508 and set feedback indicator to 4×2. Method 500 may then proceed to 1506 from 1508.

If the feedback error at 1506 is high, method 1500 continues from 1506 to 1510 which comprises turning on the error feedback indicator. Thus, a vehicle operator may be notified of the high error feedback. Method 1500 then returns. However, at 1506 if the error feedback is not high, method 1500 continues to 1512 from 1506 and the error feedback indicator is turned off. Method 1500 then returns.

Thus, by first decreasing, and then increasing transfer case torque when switching between 4×4 and 4×2 modes, a disconnect positioned between a transfer case disconnect and one or more wheels may be shifted to a disengaged position and torque lock conditions of a clutch collar of the disconnect may be reduced. As such, this may ensure that the disconnect disengages when a transfer case disconnect disengages. As such, frictional drag losses and fuel consumption may be reduced.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A method comprising:
responsive to a desired shift from a four-wheel drive mode to a two-wheel drive mode:
decreasing a transfer case torque output to a secondary driveline to a lower first level and disengaging a disconnect device of the secondary driveline;
increasing the transfer case torque output from the lower first level to a higher second level; and
reducing the transfer case torque output from the higher second level to decouple the secondary driveline.

2. The method of claim 1, wherein the desired shift from the four-wheel drive mode to the two-wheel drive mode is commanded by a vehicle operator.

3. The method of claim 1, wherein the desired shift from the four-wheel drive mode to the two-wheel drive mode is commanded by a vehicle controller based on vehicle operating conditions, the operating conditions including one or more of: throttle position, accelerator pedal position, wheel speed, ambient temperature, steering angle, vehicle yaw, windshield wiper state, driver selectable mode controls such as sport, economy, winter, etc., brake pressure, anti-lock brake control status, altitude, tire pressure, fog light state, driver and occupant presence, driving habits, weather forecast, navigation routing road conditions, terrain, and traffic conditions.

4. The method of claim 1, wherein the increasing the transfer case torque output comprises ramping up the transfer case torque output from the lower first level to the higher second level over a duration, and where after the duration, the transfer case torque is reduced to zero, to stop torque transmission to the secondary driveline.

5. The method of claim 1, wherein the secondary driveline comprises one or more driveline components not driven by an engine during the two-wheel drive mode.

6. The method of claim 1, wherein the increasing the transfer case torque comprises increasing one or more of a current and voltage to an actuator of a transfer case disconnect clutch to shift a clutch collar of the transfer case disconnect clutch to an engaged position where the secondary driveline is coupled to a transfer case and receives torque output from the engine.

7. The method of claim 1, wherein the decreasing and reducing the transfer case torque comprises decreasing one or more of the current and voltage to an actuator of a transfer case disconnect clutch to shift a clutch collar of the transfer case disconnect clutch to a disengaged position where the secondary driveline is not coupled to the transfer case and does not receive torque output from the engine.

8. The method of claim 1, wherein the decreasing the transfer case torque comprises stepping down the transfer case torque to the lower first level.

9. The method of claim 1, wherein the increasing the transfer case output torque is initiated in response to the transfer case output torque reaching the lower first level.

10. The method of claim 1, wherein the increasing the transfer case output torque is initiated after waiting a duration once the transfer case output torque reaches the lower first level.

11. The method of claim 1, wherein the increasing the transfer case output torque is initiated in response to a determination that the disconnect device remains in the engaged position.

12. The method of claim 1, wherein the increasing the transfer case output torque when shifting to the two-wheel drive mode occurs only when the disconnect device does not disengage after the transfer case output torque is decreased to the lower first level, and where, when the disconnect device disengages after decreasing the transfer case torque output to the lower first level, the transfer case output torque is maintained at the lower first level.

13. A system comprising:
   a vehicle powertrain comprising:
      an engine;
      a transfer case;
      a primary driveline including a first pair of wheels, the primary driveline drivingly coupled to the engine;
      a secondary driveline including a second pair of wheels, the secondary driveline selectively coupled to the engine via the transfer case;
      a secondary driveline disconnect positioned in the secondary driveline; and
      a controller with computer readable instructions stored in non-transitory memory for:
         engaging the engine and secondary driveline when a shift from a two-wheel drive mode to a four-wheel drive mode is desired; and
         disengaging, and then re-engaging for a duration, before again disengaging the secondary driveline and engine when a shift from the four-wheel drive mode to the two-wheel drive mode is desired.

14. The system of claim 13, wherein the controller further includes computer readable instructions stored in non-transitory memory for:
   engaging the driveline disconnect when a shift from the two-wheel drive mode to the four-wheel drive mode is desired; and
   disengaging the driveline disconnect when a shift from the four-wheel drive mode to the two-wheel drive mode is desired.

15. The system of claim 13, wherein the transfer case further comprises a transfer case disconnect, where the transfer case disconnect is shifted to an engaged position by increasing an amount of electrical power supplied to the transfer case disconnect when engaging the engine and secondary driveline, where an amount of torque transmitted to the secondary driveline increases as the transfer case disconnect is adjusted towards the engaged position, and where the transfer case disconnect is shifted to a disengaged position by decreasing the amount of electrical power supplied to the transfer case disconnect when disengaging the secondary driveline and engine, where the amount of torque transmitted to the secondary driveline decreases as the transfer case disconnect is adjusted towards the disengaged position.

16. A method comprising:
   increasing a transfer case coil voltage from a lower first level to a higher second level when shifting from a two-wheel drive mode to a four-wheel drive mode and then adjusting the coil voltage based on vehicle operating conditions in the four-wheel drive mode; and
   stepping down the coil voltage to the lower first level, then increasing the coil voltage from the lower first level to the higher second level, and then stepping down the coil voltage from the higher second level to the lower first level when shifting from a four-wheel drive mode to a two-wheel drive mode, and then maintaining the coil voltage at the lower first level in the two-wheel drive mode.

17. The method of claim 16, wherein the increasing the coil voltage from the lower first level to the higher second level when shifting from the four-wheel drive mode to the two-wheel drive mode comprises ramping up the coil voltage from the lower first level to the higher second level over a duration.

18. The method of claim 16 further comprising, indicating to a vehicle operator that a shift error has occurred when a secondary driveline disconnect device remains in an engaged position after a shift to the two-wheel drive mode.

19. The of claim 16 further comprising, stopping increasing the transfer case torque before reaching the higher second level when increasing the coil voltage from the lower first level when shifting from the four-wheel drive mode to the two-wheel drive mode, in response to a secondary driveline disconnect device disengaging.

20. The method of claim 16, wherein the adjusting the coil voltage based on vehicle operating conditions in the four-wheel drive mode comprises adjusting an amount of torque transmitted to a secondary driveline based on one or more of a throttle position, a difference in speeds between left and right wheels of an axle, a difference in speeds between rear and front wheels, and a vehicle speed.

* * * * *